(12) United States Patent
Carlin et al.

(10) Patent No.: US 6,401,105 B1
(45) Date of Patent: Jun. 4, 2002

(54) ADAPTIVE TEXTUAL SYSTEM FOR ASSOCIATING DESCRIPTIVE TEXT WITH VARYING DATA

(75) Inventors: Richard Carlin; Peter Thacker; Kimberly Haley-Coleman, all of Houston, TX (US)

(73) Assignee: Telescan, Inc., Houston, TX (US)

( * ) Notice: Subject to any disclaimer, the term of this patent is extended or adjusted under 35 U.S.C. 154(b) by 0 days.

(21) Appl. No.: 09/349,536

(22) Filed: Jul. 8, 1999

(51) Int. Cl.[7] ............................................... G06F 15/00
(52) U.S. Cl. ........................ 707/512; 707/505; 707/507; 707/104.1; 704/2; 704/7; 705/7; 705/10
(58) Field of Search .................................. 707/104, 507, 707/505, 512, 100, 500; 704/1–10; 705/77, 10, 1

(56) References Cited

U.S. PATENT DOCUMENTS

| | | | | |
|---|---|---|---|---|
| 5,101,375 A | * | 3/1992 | Goldhor | 707/530 |
| 5,383,121 A | * | 1/1995 | Letkeman | 364/419.11 |
| 5,471,575 A | * | 11/1995 | Giansante | 395/144 |
| 5,802,493 A | * | 9/1998 | Sheflott et al. | 705/1 |
| 6,061,694 A | * | 5/2000 | Janay et al. | 707/507 |
| 6,092,208 A | * | 7/2000 | Alpert et al. | 707/104.1 |
| 6,182,095 B1 | * | 1/2001 | Leymaster et al. | 706/46 |

OTHER PUBLICATIONS

Spillman et al., Automated Annotation of PL/I Source Listings. IBM TDB, vol. 17, No. 7, Dec. 1974.*
VectorVest: The Intelligent Way to Manage your Portfolio, Internet Web Site.
Microsoft MSN Money Central Investor, Internet Web Site.

* cited by examiner

*Primary Examiner*—Kim Vu
*Assistant Examiner*—Joon Hwan Hwang
(74) *Attorney, Agent, or Firm*—Conley, Rose & Tayon, P.C.

(57) ABSTRACT

An interpretive text system implemented in a host computer system. The host computer system, which may include multiple computers coupled together, includes one or more processors, memory, a fixed disk storage device and an interface to a communication link. The communications link provides a communication medium by which users can access the host computer from remote locations. The host computer includes interpretive text logic, which preferably is implemented in software running on the processor(s), that automatically generates a textual explanation of a set of variable data in response to user input. For example, the user may wish to see an explanation of a set of financial technical data regarding a particular security. The interpretive text logic automatically customizes a textual explanation for that particular security and provides the explanation to the user.

6 Claims, 27 Drawing Sheets

160 \\
FINANCIAL INTERPRETIVE TEXT (FIT)

S OPENED ON THE LATEST TRADING DAY AT 43.250 AND WAS MOST CURRENTLY TRADING AT 42.812 ON VOLUME OF 857,800 AFTER HAVING SOLD FOR AS HIGH AS 43.875 AND AS LOW AS 42.812. VOLUME CAN TELL YOU A LOT ABOUT HOW MUCH INTEREST IS CURRENTLY FOCUSED ON A STOCK. THE LATEST TRADING VOLUME FOR S IS 62% OF ITS AVERAGE DAILY VOLUME, AS CALCULATED USING THE LAST THIRTY DAYS OF ACTIVITY.

AS FAR AS FUNDAMENTAL RATIOS GO, FEW ARE MORE WATCHED THAN THE PRICE-TO-EARNINGS. IN THE CASE OF THIS STOCK, WITH A P/E OF 15.8, THE RATIO SUGGESTS THAT IS MAY BE QUITE UNDERVALUED RELATIVE TO OTHERS STOCKS IN ITS SECTOR.

AT LEAST ONE MOVING AVERAGE INDICATOR (THE 200-DAY) SUGGESTS THAT THIS STOCK TECHNICALLY MAY BE SOMETHING OF A BARGAIN AT THIS PRICE (FROM A LONGER-TERM PERSPECTIVE). THIS DOES NOT MEAN THAT THE STOCK IS ABOUT TO RISE. ACTUALLY, IT INDICATES THAT IT STILL APPEARS TO BE IN A BEARISH TREND. THIS ANALYSIS IS BASED ON THE FACT THAT THE STOCK PRICE IS SLIGHTLY BELOW THE 200-DAY MOVING AVERAGE. DEPENDING ON HOW THE TREND HAS DEVELOPED (HAS IT RECENTLY TAKEN A DOWN-TURN OR AN UP-TURN FROM ITS DISTANCE FROM THE PRICELINE?), THIS COULD BE A BULLISH OR BEARISH CONDITION.

IF YOU LOOK AT THE STOCK PRICE IN COMPARISON TO A 50-DAY MOVING AVERAGE, THE SEEMS TO BE IN A BULLISH TREND, AS THE PRICE IS SLIGHTLY ABOVE THIS LAGGING INDICATOR.

IN CLOSING, LET'S LOOK AT A MUCH SHORTER MOVING AVERAGE LINE. THE 10-DAY MOVING AVERAGE IN THIS CASE IS HIGHER THAN THE PRICE LINE. LOOKS LIKE IT'S BEEN IN AND STILL CONTINUES TO BE IN A BULLISH TREND. BUT RECALL THAT SOME TECHNICIANS WOULD SAY THAT THIS COULD SIGNAL AN OVERBOUGHT OR EXTENDED CONDITION. IF THAT WERE INDEED THE CASE, THAN A FALL COULD BE IN THE FUTURE - THOUGH THE TIMING IS NOT ABLE TO BE DETERMINED. REMEMBER THAT MOVING AVERAGES CAN HELP YOU SEE IF AN EXISTING TREND IS STILL HAPPENING AND HELP IN DISTINGUISHING WHEN A CHANGE IN TREND HAS HAPPENED. ON THE DOWN SIDE, IT WILL NOT LET YOU KNOW AHEAD OF TIME THAT A CHANGE IS ABOUT TO OCCUR. CONSERVATIVE INVESTORS OFTEN LOOK FOR A STOCK PRICE TO CLOSE ABOVE THE 200-DAY MOVING AVERAGE AS CONFIRMATION OF A POSITIVE TREND CHANGE BEFORE PUTTING THEIR MONEY IN A STOCK. A COMBINATION OF THESE AVERAGES IS PROBABLY A WISE THING TO CONSIDER. IF YOU DECIDE TO DO THIS, REMEMBER THAT THE SHORTER TIME PERIOD MOVING AVERAGE LINE SHOULD BE ABOVE THE LONGER ONE IN ORDER TO SUPPORT A BULLISH STANCE.

THE ABOVE REPORT IS BASED ON MATHEMATICAL CALCULATIONS AND, AS SUCH, NO INVESTMENT DECISION SHOULD BE BASED SOLELY ON ITS CONCLUSIONS. FOLLOW THIS LINK FOR THE FULL DISCLAIMER.

FIG.3

DEGVAL
RANKING_INTRODUCTION_INDEX ⟍
+2   91    97
+1   71    90                    170
0    31    70
-1   11    30
-2   4     10        170
ANALYST_RANK ⟋    176
+2  |91    97|  180
+1  |71    90|  178
0   |31    70|
-1  |11    30|  178
174 -2  |4    10|        170
CHANGE_IN_ANALYST_RANK
+2   31    40
+1   11    30
0    -10   10
-1   -30   -11
-2   -40   -31        170
WWN_ANALYST_RANK
+2   91    97
+1   71    90
0    31    70
-1   11    30
-2   4     10
FUNDAMENTAL_RANK
+2   91    97
+1   71    90
0    31    70
-1   11    30
-2   4     10
CHANGE_IN_FUNDAMENTAL_RANK
+2   31    40
+1   11    30
0    -10   10
-1   -30   -11
-2   -40   -31
WWN_FUNDAMENTAL_RANK
+2   91    97
+1   71    90
0    31    70
-1   11    30
-2   4     10
SHORT_TERM_GROWTH_RANK
+2   91    97
+1   71    90
0    31    70
-1   11    30
-2   4     10

*FIG.4A*

```
           DEGVAL                              DEGVAL
CHANGE_IN_SHORT_TERM_GROWTH_RANK    MOMENTUM_RANK
+2    31    40                      +2    91    97
+1    11    30                      +1    71    90
 0   -10    10                       0    31    70
-1   -30   -11                      -1    11    30
-2   -40   -31                      -2     4    10
WWN_SHORT_TERM_GROWTH_RANK          CHANGE_IN_MOMENTUM_RANK
+2    91    97                      +2    31    40
+1    71    90                      +1    11    30
 0    31    70                       0   -10    10
-1    11    30                      -1   -30   -11
-2     4    10                      -2   -40   -31
LONG_TERM_GROWTH_RANK               WWN_MOMENTUM_RANK
+2    91    97                      +2    91    97
+1    71    90                      +1    71    90
 0    31    70                       0    31    70
-1    11    30                      -1    11    30
-2     4    10                      -2     4    10
CHANGE_IN_LONG_TERM_GROWTH_RANK     SHORT_TERM_TECHNICAL_RANK
+2    31    40                      +2    91    97
+1    11    30                      +1    71    90
 0   -10    10                       0    31    70
-1   -30   -11                      -1    11    30
-2   -40   -31                      -2     4    10
WWN_LONG_TERM_GROWTH_RANK           CHANGE_IN_SHORT_TERM_TECHNICAL_RANK
+2    91    97                      +2    31    40
+1    71    90                      +1    11    30
 0    31    70                       0   -10    10
-1    11    30                      -1   -30   -11
-2     4    10                      -2   -40   -31
INSIDER_RANK                        WWN_SHORT_TERM_TECHNICAL_RANK
+2    91    97                      +2    91    97
+1    71    90                      +1    71    90
 0    31    70                       0    31    70
-1    11    30                      -1    11    30
-2     4    10                      -2     4    10
CHANGE_IN_INSIDER_RANK              LONG_TERM_TECHNICAL_RANK
+2    31    40                      +2    91    97
+1    11    30                      +1    71    90
 0   -10    10                       0    31    70
-1   -30   -11                      -1    11    30
-2   -40   -31                      -2     4    10
WWN_INSIDER_RANK                    CHANGE_IN_LONG_TERM_TECHNICAL_RANK
+2    91    97                      +2    31    40
+1    71    90                      +1    11    30
 0    31    70                       0   -10    10
-1    11    30                      -1   -30   -11
-2     4    10                      -2   -40   -31
         FIG.4B                              FIG.4C
```

FIG.4D

```
              DEGVAL
WWN_LONG_TERM_TECHNICAL_RANK
+2    91    97
+1    71    90
 0    31    70
-1    11    30
-2     4    10
SHORT_TERM_VALUE_RANK
+2    91    97
+1    71    90
 0    31    70
-1    11    30
-2     4    10
CHANGE_IN_SHORT_TERM_VALUE_RANK
+2    31    40
+1    11    30
 0   -10    10
-1   -30   -11
-2   -40   -31
WWN_SHORT_TERM_VALUE_RANK
+2    91    97
+1    71    90
 0    31    70
-1    11    30
-2     4    10
LONG_TERM_VALUE_RANK
+2    91    97
+1    71    90
 0    31    70
-1    11    30
-2     4    10
CHANGE_IN_LONG_TERM_VALUE_RANK
+2    31    40
+1    11    30
 0   -10    10
-1   -30   -11
-2   -40   -31
WWN_LONG_TERM_VALUE_RANK
+2    91    97
+1    71    90
 0    31    70
-1    11    30
-2     4    10
VOLUME_RANK
+2    91    97
+1    71    90
 0    31    70
-1    11    30
-2     4    10
```

FIG.4E

```
              DEGVAL
CHANGE_IN_VOLUME_RANK
+2    31    40
+1    11    30
 0   -10    10
-1   -30   -11
-2   -40   -31
WWN_VOLUME_RANK
+2    91    97
+1    71    90
 0    31    70
-1    11    30
-2     4    10
ZACKS_INTRODUCTION_INDEX
+2    91    97
+1    71    90
 0    31    70
-1    11    30
-2     4    10
CURRENT_FY_MEAN_PCT_CHANGE
+2     6.00   10.00
+1     2.00    5.99
 0    -1.99    1.99
-1    -5.99   -2.00
-2   -10.00   -6.00
NEXT_FY_MEAN_PCT_CHANGE
+2     6.00   10.00
+1     2.00    5.99
 0    -1.99    1.99
-1    -5.99   -2.00
-2   -10.00   -6.00
NEXT_5_YR_MEAN_PCT_CHANGE
+2     6.00   10.00
+1     2.00    5.99
 0    -1.99    1.99
-1    -5.99   -2.00
-2   -10.00   -6.00
CURRENT_FY_HIGH_LOW_PCT_CHANGE
+2    30.00   50.00
+1    10.00   29.99
 0    -9.99    9.99
-1   -29.99  -10.00
-2   -50.00  -30.00
NEXT_FY_HIGH_LOW_PCT_CHANGE
+2    30.00   50.00
+1    10.00   29.99
 0    -9.99    9.99
-1   -29.99  -10.00
```

```
                    DEGVAL                                    DEGVAL
         -2    -50.00   -30.00                   -2     0      0
         NEXT_5_YR_HIGH_LOW_PCT_CHANGE           AVG_PCT_POS_SURPRISE
         +2     30.00    50.00                   +2    17     20
         +1     10.00    29.99                   +1    13     16
          0     -9.99     9.99                    0     9     12
         -1    -29.99   -10.00                   -1     5      8
         -2    -50.00   -30.00                   -2     0      4
         NO_ESTIMATES_CURRENT_FY                 NO_NEG_SURPRISES_LAST_4
         +2     22       25                      +2     3      4
         +1     16       21                      +1     2      3
          0     10       15                       0     1      2
         -1      4        9                      -1     0      1
         -2      1        3                      -2     0      0
         CO_INDUSTRY_RATIO_CURRENT_FY            AVG_PCT_NEG_SURPRISE
         +2      1.4      1.5                    +2    17     20
         +1      1.2      1.3                    +1    13     16
          0      1.0      1.1                     0     9     12
         -1      0.7      0.9                    -1     5      8
         -2      0.5      0.6                    -2     0      4
         CO_INDUSTRY_RATIO_NEXT_FY               ANALYST_RATINGS
         +2      1.4      1.5                    +2     4.6    4.8
         +1      1.2      1.3                    +1     4.1    4.5
          0      1.0      1.1                     0     2.0    4.0
         -1      0.7      0.9                    -1     1.5    2.9
         -2      0.5      0.6                    -2     1.2    1.4
         CO_INDUSTRY_RATIO_NEXT_5                GRAPH_INTRO_INDEX
         +2      1.4      1.5                    +2    22     25
         +1      1.2      1.3                    +1    16     21
          0      1.0      1.1                     0    10     15
         -1      0.7      0.9                    -1     4      9
         -2      0.5      0.6                    -2     1      3
         CO_IND_RATIO_PE_CURRENT_FY              GRAPH_YEAR_HIGH_LOW
         +2      1.4      1.5                    +2    22     25
         +1      1.2      1.3                    +1    16     21
          0      1.0      1.1                     0    10     15
         -1      0.7      0.9                    -1     4      9
         -2      0.5      0.6                    -2     1      3
         EPS_SURPRISE_PCT_MOST_RECENT            GRAPH_RESISTANCE_SUPPORT
         +2     30.00    50.00                   +2    22     25
         +1     10.00    29.99                   +1    16     21
          0     -9.99     9.99                    0    10     15
         -1    -29.99   -10.00                   -1     4      9
         -2    -50.00   -30.00                   -2     1      3
         NO_POS_SURPRISES_LAST_4                 GRAPH_OPEN_GAP
         +2      3        4                      +2    11     25
         +1      2        3                      +1     3     10
          0      1        2                       0    -2      2
         -1      0        1                      -1   -10     -3
                    FIG.4F                                   FIG.4G
```

DEGVAL
-2   -25   -11
GRAPH_PE_REL_INDUST
+2   22    25
+1   16    21
 0   10    15
-1    4     9
-2    1     3
GRAPH_LONG_MA
+2   11    25
+1    3    10
 0   -2     2
-1  -10    -3
-2  -25   -11
GRAPH_INTER_MA
+2   11    25
+1    3    10
 0   -2     2
-1  -10    -3
-2  -25   -11
GRAPH_SHORT_MA
+2   11    25
+1    3    10
 0   -2     2
-1  -10    -3
-2  -25   -11
GRAPH_VOLUME
+2   11    25
+1    3    10
 0   -2     2
-1  -10    -3
-2  -25   -11

TEXTITEM
[STOCKS WITH A HIGH SCORE FOR THIS INDICATOR HAVE LATELY CORRELATED VERY POORLY WITH
STOCKS THAT OUTPERFORM THEIR PEER GROUPS.]
[AND WHAT ABOUT ANY CORRELATION BETWEEN GREAT MOMENTUM AND PRICE INCREASES?
UNFORTUNATELY, THERE'S RECENTLY BEEN ONLY A VERY POOR DEGREE OF CORRELATION BETWEEN GREAT
MOMENTUM AND STOCKS THAT OUTPERFORM THEIR PEER GROUPS.]
[WOULD IT MAKE YOUR DAY TO KNOW THAT THERE'S RECENTLY BEEN A HIGH DEGREE OF
CORRELATION BETWEEN GREAT MOMENTUM AND SOME POSITIVE PRICE PERFORMANCE? HOPE
NOT, BECAUSE THAT IS DEFINITELY NOT THE CASE. IN TRUTH, THERE HAS ONLY BEEN A VERY POOR
CORRELATION RECENTLY BETWEEN HIGH MOMENTUM AND STOCKS THAT OUTPERFORM THEIR PEER GROUPS.]

* WWN_MOMENTUM_RANK -3 *     /184

186  [STOCKS WITH A HIGH SCORE FOR THIS INDICATOR HAVE NOT LATELY CORRELATED AT ALL WITH
STOCKS THAT OUTPERFORM THEIR PEER GROUPS.]

188  [AND WHAT ABOUT ANY CORRELATION BETWEEN GREAT MOMENTUM AND PRICE INCREASES?
UNFORTUNATELY, THERE HAS NOT RECENTLY BEEN ANY DEGREE OF CORRELATION BETWEEN GREAT
MOMENTUM AND STOCKS THAT OUTPERFORM THEIR PEER GROUPS.]

190  [WOULD IT MAKE YOUR DAY TO KNOW THAT THERE'S RECENTLY BEEN A HIGH DEGREE OF
CORRELATION BETWEEN GREAT MOMENTUM AND SOME POSITIVE PRICE PERFORMANCE? HOPE
NOT, BECAUSE THAT IS DEFINITELY NOT THE CASE. IN TRUTH, THERE HAS BEEN NO
CORRELATION AT ALL RECENTLY BETWEEN HIGH MOMENTUM AND STOCKS THAT OUTPERFORM
THEIR PEER GROUPS.]      /184

* SHORT_TERM_TECHNICAL_RANK + 3 *

[THE VALUE FOR SHORT TERM TECHNICAL RANK INDICATES THAT POPULAR SHORT-TERM TECHNICAL
INDICATORS (USING MOVING AVERAGES, PRICE, AND VOLUME) ARE AT EXCEPTIONAL LEVELS.]
[UNDERSTAND THAT THE HIGH SCORE FOR SHORT TERM TECHNICAL RANK DOES NOT
NECESSARILY SAY ANYTHING ABOUT THE SHORT TERM OUTLOOK. WHAT IT MEANS IS THAT
THE SCORES FOR POPULAR SHORT-TERM TECHNICAL INDICATORS (USING MOVING AVERAGES,
PRICE, AND VOLUME) ARE AT MUCH BETTER-THAN-AVERAGE LEVELS. YOU SHOULD

FIG.5A

TEXTITEM
AND LOOK INTO THE STOCK SOME MORE.]
[THE FUNDAMENTAL STRENGTH OF THIS STOCK, AS MEASURED USING BALANCE SHE
ET INDICATORS SUCH AS
DEBT -TO-EQUITY AND CURRENT RATIOS, LOOKS QUESTIONABLE; BUT THE ANALYST
S LIKE IT ANYWAY.
WHAT'S BEHIND THE APPARENT DISCREPANCY? UNFORTUNATELY, THERE'S NO TELL
ING UNLESS YOU LOOK
INTO WHAT THE ANALYSTS THEMSELVES HAVE TO SAY ON THE SUBJECT.]

* ANAYLYST_RANK +3 AND FUNDAMENTAL_RANK -2 *    ——194

[WHEN ANALYSTS LIKE A STOCK THIS MUCH, BUT THE FUNDAMENTALS LOOK QUEST
IONABLE, IT'S
DIFFICULT TO MAKE ANY SOLID CONCLUSION BEYOND THE FACT THAT MORE RESEA
RCH SHOULD BE DONE.]        196

[THE FUNDAMENTAL STRENGTH OF THIS STOCK, AS MEASURED USING BALANCE SHE
ET INDICATORS SUCH AS
DEBT-TO-EQUITY AND CURRENT RATIOS, LOOKS DUBIOUS; BUT THE ANALYSTS SEE
M TO LOVE IT JUST THE
SAME.  THERE ARE LOTS OF POSSIBLE REASONS FOR THIS. JUST WHICH ONE TH
AT COULD BE WILL
REQUIRE FURTHER INVESTIGATION ON YOUR PART.]     198

* ANALYST_RANK +2 AND FUNDAMENTAL_RANK +3 *
[THESE ARE THE KIND OF FUNDAMENTALS AN ACCOUNTANT LIKES TO SEE. THE F
ACT THAT THE ANALYSTS
FIND THE COMPANY APPEALING ALSO POINTS TO A BULLISH VIEW OF THE STOCK.
]
[THE FUNDAMENTAL STRENCTH OF THIS STOCK, AS MEASURED USING BALANCE SHE
ET INDICATORS SUCH AS
DEBT-TO-EQUITY AND CURRENT RATIOS, LOOKS SOLID. THIS MAKES IT ALL THE
MERRIER THAT THE
ANALYSTS LIKE IT.]

* ANALYST_RANK +2 AND FUNDAMENTAL_RANK +2 *
[THIS COMPANY HAS AT LEAST TWO THINGS GOING FOR IT: A RESPECTABLE OPIN
ION BY ANALYSTS AND
SOME FAIRLY SOLID BALANCE SHEET INDICATORS.]
[YOU MIGHT EXPECT IT, BUT IT'S NICE TO SEE ALL THE SAME. THE BOOKS OF
THIS COMPANY APPEAR
TO BE IN QUITE GOOD SHAPE, AND THE ANALYSTS HAVE LIKEWISE REWARDED IT
WITH THEIR HIGH
OPINION.  THIS IS A GOOD START TO YOUR KNOWLEDGE OF THE STOCK.]

* ANALYST_RANK +2 AND FUNDAMENTAL_RANK -3 *
[THE BOOKS OF THIS COMPANY LEAVE PLENTY OF ROOM FOR IMPROVEMENT, YET T
HE ANAYLYSTS
APPERENTLY FIND IT HAS SOME REDEEMING QUALITIES.  OR MAYBE THEY WERE D
ISTRACTED WHEN THEY

FIG.5B

TEXTITEM

VOLUME, RELATIVE
PERFORMANCE AND MOVING AVERAGE CRITERIA, THIS STOCK IS PERFORMING SPLE
NDIDLY. THIS MAKES
IT ALL THE MORE DISAPPOINTING THAT RECENT CHANGES IN ACCUMULATION-DIST
RIBUTION, SECTOR
RANK, PRICE RANK AND EARNINGS NAVE COMBINED FOR A STOCK WITH LOW MOMEN
TUM. YOU NEED TO
GIVE THIS STOCK MORE EXAMINATION BEFORE MAKING ANY DECISIONS.]

* SHORT_TERM_TECHNICAL_RANK +2 AND MOMENTUM RANK +3 *
[THIS CAN BE FUN TO SEE! THIS STOCK'S SHORT-TERM MOVING AVERAGE CONVER
GENCE DIVERGENCE,
VOLUME, RELATIVE PERFORMANCE AND MOVING AVERAGE CRITERIA TOGETHER HAVE
MADE FOR A GOOD
SHORT-TERM TECHNICAL OUTLOOK. AND TO BOOT, ITS MOMENTUM, AS MEASURED
BY RECENT CHANGES
IN ACCUMULATION-DISTRIBUTION, SECTOR RANK, PRICE RANK AND EARNINGS REA
LLY BACKS UP THE
BULLS FOR THE STOCK.]

* SHORT_TERM_TECHNICAL_RANK +2 AND MOMENTUM_RANK +2 *
[TWO THUMBS UP: ONE BECAUSE THIS STOCK'S SHORT-TERM MOVING AVERAGE CON\
VERGENCE DIVERGENCE,
VOLUME, RELATIVE PERFORMANCE AND MOVING AVERAGE CRITERIA TOGETHER HAVE
MADE FOR A DECENT
SHORT-TERM TECHNICAL OUTLOOK. THE OTHER BECAUSE ITS MOMENTUM, AS MEAS
URED BY RECENT
CHANGES INL ACCUMULATION-DISTRIBUTION, SECTOR RANK, PRICE RANK AND EARN
INGS, HAVE GIVEN IT
SOME COMMENDABLE MOMENTUM.]

* SHORT_TERM_TECHNICAL_RANK +2 AND MOMENTUM RANK -3 *
[LOOKS LIKE SOME CROSSED WIRES HERE. THE STOCK'S SHORT-TERM MOVING AV
ERAGE CONVERGENCE
DIVERGENCE, VOLUME, RELATIVE PERFORMANCE AND MOVING AVERAGE CRITERIA T
OGETHER HAVE MADE
FOR A GOOD SHORT-TERM TECHNICAL OUTLOOK. HOWEVER, ITS MOMENTUM, AS ME
ASURED BY RECENT
CHANGES IN ACCUMULATION-DISTRIBUTION, SECTOR RANK, PRICE RANK AND EARN
INGS, LOOKS
TERRIBLE. THIS MEANS YOU'VE GOT SOME MORE RESEARCH TO DO.]

* SHORT_TERM_TECHNICAL_RANK +2 AND MOMENTUM RANK -2 *
[IF, AS IN THIS CASE, A STOCK'S SHORT-TERM MOVING AVERAGE CONVERGENCE
DIVERGENCE, VOLUME,
RELATIVE PERFORMANCE AND MOVING AVERAGE CRITERIA TOGETHER HAVE MADE FO
R A GOOD SHORT-TERM
TECHNICAL OUTLOOK, AND YET ITS MOMENTUM, AS MEASURED BY RECENT CHANGES

FIG.5C

TEXTITEM

VEMENT) ON VOLUME OF &&CURRENTVOLUME AFTER HAVING SOLD FOR AS HIGH AS
—
THE EXCITING NEW HIGH FOR THE YEAR — &&DAILYHIGH AND AS LOW AS &&DAILY
LOW.
BECAUSE OF THE NEW YEARLY HIGH, THERE IS NO OTHER REAL RESISTANCE AHEA
D OF THIS
STOCK THAT HAS BEEN ESTABLISHED OVER THE PAST TWELVE MONTHS.]]
[WERE YOU HOPING TO BUY &&TICKER LAST WEEK AND JUST NEVER GOT AROUND T
O IT?
IF SO YOU MAY BE KICKING YOURSELF, BECAUSE AS OF THE LATEST TRADING DA
Y, IT                                                                    192
REACHED A NEW HIGH FOR THE PAST YEAR. IT OPENED AT &&DAILYOPEN AND WA
S MOST                                          192
CURRENTLY TRADING AT &&CURRENTQUOTE ON VOLUME OF &&CURRENTVOLUME AFTER
HAVING
SOLD FOR AS HIGH AS — YES! THE NEW HIGH FOR THE YEAR — &&DAILYHIGH AN
D AS LOW
AS &&DAILYLOW — WHICH IS A &&RANGE% TRADING RANGE. THIS MEANS THAT FR
OM A
TECHNICIAN'S VIEWPOINT, NO OTHER SIGNIFICANT RESISTANCE CURRENTLY LIES
AHEAD OF
THIS STOCK, BECAUSE IT HAS ALREADY CROSSED IT.]
X
* GRAPH_YEAR_HIGH_LOW −1 AND GRAPH_INTRO_INDEX +1 *
[THERE'S SOME PRETTY BAD NEWS FOR &&TICKER! DURING THIS LATEST TRADIN
G DAY,                                             192
THE STOCK REACHED A NEW LOW FOR THE TRAILING TWELVE MONTHS. IT OPENED
AT
&&DAILYOPEN AND WAS MOST CURRENTLY TRADING AT &&CURRENTQUOTE ON VOLUME
OF
&&CURRENTVOLUME AFTER HAVING SOLD FOR AS HIGH AS &&DAILYHIGH AND AS LO
W AS
&&DAILYLOW (THE NEW YEARLY LOW). THIS MEANS THAT OVER THE DAY THE HAS
SEEN A &&RANGE% PRICE MOVEMENT. LOOK AT A GRAPH WITH A LONGER-TERM V
IEWPOINT
TO ESTABLISH IF ANY SUPPORT EXISTS BELOW THIS LEVEL. IF NOT, IT COULD
BE HEADED
FURTHER DOWN STILL.]
[&&TICKER REACHED A REAL LOW POINT AS OF THE LATEST TRADING DAY — LITE
RALLY.
AFTER OPENING AT &&DAILY OPEN AND MOST CURRENTLY TRADING AT &&CURRENTQ
QUOTE, IT
TRADED IN A RANGE BETWEEN A NEW LOW FOR THE PAST YEAR OF &&DAILYLOW AN
D
&&DAILYHIGH — — THAT'S A &&RANGE% RANGE IN PRICE MOVEMENT. &&CURRENTV
OLUME
SHARES HAVE TRADED HANDS ON THIS DAY. AT WHAT
PRICE IS THIS STOCK LIKELY TO STOP SLIDING? A TECHNICIAN MIGHT ADVISE

FIG.5D

TEXTITEM

YOU TO
LOOK FOR A SUPPORT LEVEL, WHICH WILL EXIST BEYOND THE SCOPE OF A ONE-Y
EAR GRAPH.
BECAUSE IN THIS CASE, THE STOCK HAS ALREADY VIOLATED ALL SUPPORT LEVEL
S.]
[YOU QUESTION FROM LOOKING AT THIS GRAPH MAY BE, HAS &&TICKER HIT BOTT
OM?
THERE'S NO WAY TO BE SURE, BUT IT IS CLEAR THAT THE STOCK REACHED A NE
W LOW FOR
THE PAST YEAR AT &&DAILYLOW ON THE LATEST TRADING DAY. IT OPENED AT &
&DAILYOPEN
AND MOST RECENTLY WAS TRADING AT &&CURRENT QUOTE, WITH THE MOST RECENT
VOLUME
STATISTICS SHOWING THAT &&CURRENTVOLUME SHARES HAVE TRADED HANDS. OVE
R THE
COURSE OF THE DAY THE STOCK HAS EXPERIENCED A &&RANGE% RANGE IN PRICE
MOVEMENT.
THIS MEANS THAT YOU WILL HAVE TO LOOK OUTSIDE OF THE ONE-YEAR OUTLOOK
TO SEE IF
ANY OTHER SUPPORT EXISTS FROM A TECHNICIAN'S VIEWPOINT.]

* GRAPH_YEAR_HIGH_LOW +0 AND GRAPH_INTRO_INDEX +0 *
[AS OF THE LATEST TRADING DAY, &&TICKER OPENED AT &&DAILYOPEN AND WAS
MOST
CURRENTLY TRADING AT &&CURRENTQUOTE ON VOLUME OF &&CURRENTVOLUME AFTER
HAVING
SOLD FOR AS HICH AS &&DAILYHIGH (THE NEW YEARLY HIGH) AND AS LOW AS &&
DAILYLOW.
THIS REPRESENTS A PRICE MOVEMENT RANGE OF &&RANGE% OVER THE COURSE OF
THE DAY.]
[&&TICKER OOENED ON THE LATEST TRADING DAY AT &&DAILYOPEN AND WAS MOST

CURRENTLY TRADING AT &&CURRENTQUOTE ON VOLUME OF &&CURRENTVOLUME AFTER
HAVING
SOLD FOR AS HIGH AS &&DAILYHIGH AND AS LOW AS &&DAILYLOW.]
[ON THE LATEST TRADING DAY, &&TICKER HAS TRADED BETWEEN &&DAILYHIGH AN
D
&&DAILYLOW, FOLLOWING ITS OPEN AT &&DAILYOPEN. THE DIFFERENCE BETWEEN
THESE TWO
EXTREMES REPRESENTS A TRADING RANGE OF &&RANGE%. &&CURRENTVOLUME SHARE
S HAVE
TRADED HANDS SO FAR ON THIS SAME DAY.]
[WHAT KIND OF PRICE MOVEMENT IS OCCURING WITH &&TICKER, ACCORDING TO
THE
LATEST MARKET INFORMATION? ITS MOST RECENT OPEN WAS AT &&DAILYOPEN, W
WITH A
RANGE THUS FAR BETWEEN &&DAILYHIGH AND &&DAILYCLOSE (WHICH REPRESENTS
A TRADING

FIG.5E

ORDER

ORDER FILE FOR RANKING INDICATORS STATEMENTS FOR INTELLIGENT TEXT GENERATOR

*[ANALYST_RANK] [CHANGE_IN_ANALYST_RANK] [ WWN_ANALYST_RANK]*

*[FUNDAMENTAL_RANK] [CHANGE_IN_FUNDAMENTAL_RANK] [WWN_FUNDAMENTAL RANK] *

*[SHORT_TERM_GROWTH_RANK] [CHANGE_IN_SHORT_TERM_GROWTH_ RANK] [WWN_SHORT_TERM_GROWTH_RANK]*

*[LONG_TERM_GROWTH_RANK] [CHANGE_IN_LONG_TERM_GROWTH_RANK] [WWN_LONG_TERM_GROWTH_RANK]*

.*[INSIDER_RANK] [CHANGE_IN_INSIDER_RANK ] [ WWN_INSIDER_RANK]*

*[SHORT_TERM_TECHNICAL_RANK] [CHANGE_IN_SHORT_TERM_TECHNICAL_RANK] [WWN_SHORT_TERM_TECHNICAL_RANK]*

*[LONG_TERM_TECHNICAL_RANK] [CHANGE_IN_LONG_TERM_TECHNICAL_RANK] [WWN_LONG_TERM_TECHNICAL_RANK]*

*[SHORT_TERM_VALUE_RANK] [ CHANGE_IN_SHORT_TERM_VALUE_RANK] [WWN_SHORT_TERM_VALUE_RANK]*

* [LONG_TERM_VALUE_RANK] [CHANGE_IN_LONG_TERM_VALUE_RANK] [WWN_LONG_TERM_VALUE_RANK]*

*[VOLUME_ RANK] [CHANGE_IN_VOLUME_RANK] [WWN_VOLUME_RANK]*

*[MOMENTUM_RANK] [CHANGE_IN_MOMENTUM_RANK] [WWN_MOMENTUM_RANK]*

*[GRAPH_YEAR_HIGH_LOW AND GRAPH_INTRO_INDEX] [GRAPH_VOLUME]*

*[GRAPH_LONG_MA] [GRAPH_INTER_MA] [GRAPH_SHORT_MA]*

FIG.6

ADAPTIVE TEXTUAL SYSTEM FOR ASSOCIATING DESCRIPTIVE TEXT WITH VARYING DATA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to systems that obtain and monitor data that varies. More particularly, the present invention relates to a system that associates textual information with varying data based upon the current data values. Still more particularly, the preferred embodiment of the present invention relates to an automated system for obtaining current information of a security, and based upon that information, provides textual information that describes the performance of the security.

2. Background of the Invention

Most industrialized countries have one or more stock exchanges where stocks, bonds and other securities can be publicly traded. In the United States, there are several such stock exchanges, including the New York Stock Exchange (NYSE), the American Stock Exchange, and the NASDAQ Exchange.

The buying and selling of stocks in these various exchanges is big business. In 1997 alone, the New York Stock Exchange reported that over 133 billion shares of stock was traded, worth an estimated $5.8 trillion. Over 3,000 companies are listed on the New York Stock Exchange, with a market capitalization now well in excess of $11 trillion.

With the advent of the Internet, the buying and selling of stocks on-line has become increasingly popular. Consumers also use the Internet as a convenient vehicle to obtain information regarding publicly traded companies when deciding whether to buy or sell a particular stock. A number of companies, such as the assignee of the present invention, have specialized in providing information regarding stocks and other financial securities. In addition to providing the current price of a given security, companies such as the assignee also provide a great deal of other data, including high and low prices, price/sales ratios, sales volume, charts showing change in stock prices, and much, much more. The assignee of this invention operates a website called "Wall Street City," that can be found at http://www.wallstreetcity.com/wsc. This website provides over 250 different parameters (or variables) relative to a single stock.

An inexperienced investor usually is unable to make much sense of this large mass of technical financial data and thus is at a loss how to make investment decisions (whether to buy a particular stock, how many shares to buy, when to sell, etc.) based upon this financial data. To make sense of this data, the inexperienced investor usually is forced to consult an expert financial analyst. The analyst reviews the financial data regarding one or more stocks in which the investor is interested and manually synthesizes the data into a form that is useful to the investor. That form typically includes a narrative description summarizing some of the more pertinent pieces of data to assist the investor in evaluating the information and making informed investment decisions. Thus, financial analysts essentially "translate" technical financial data into "English" that lay investors can understand and use.

Many investors, however, do not have the resources to pay an experienced financial analyst to provide this service. Further, the financial analyst must manually generate a report unique to each investor based on the stocks in which the investor is interested. This process takes considerable time and thus, even if all potential investors had the resources to hire expert analysts, the sheer number of potential investors and potential stocks in which to invest would prevent analysts from satisfying all requests for investment analysis when needed.

It would be desirable to develop an automated or semi-automated system capable of providing up-to-date, customized descriptions of changing market conditions in a form non-financial experts can easily understand. It would also be desirable if the descriptive narrative could comment on various parameters the investor selects, but could comment on additional parameters to enhance the information provided to the investor.

Despite the apparent advantages such a system would offer, to date no such system has been made available that addresses these concerns or limitations.

SUMMARY OF THE INVENTION

Accordingly, there is provided herein an interpretive text system implemented in a host computer system. The host computer system, which may include multiple computers networked or otherwise coupled together, includes one or more processors, memory, a fixed disk storage device and an interface to a communication link. The communications link may be any one of a variety of suitable communications links, such as the Internet, and provides a communication medium by which users can access the host computer from user computers at remote locations. The host computer includes interpretive text logic, which preferably is implemented in software running on the processor(s), that automatically generates a textual explanation of a set of variable data in response to user input. For example, the user may wish to see an explanation of a set of financial technical data regarding a particular security. The interpretive text logic automatically customizes a textual explanation for that particular security and provides the textual explanation to the user.

In the context of financial securities, the interpretive text logic examines a set of variable data for the particular security specified by the user. The set of variable data reflects the most recently updated state of the specified security. The interpretive text logic compares the current values for the variable data to predetermined ranges for such data and selects character strings stored in a file on the fixed disk based on how the current values compare to the predetermined ranges. In accordance with the preferred embodiment, the predetermined ranges for the data are further defined in terms of a plurality of discrete degrees (e.g., +3, +2, +1, 0, −1, −2, −3). A +3 degree, for example, may refer to a range of values of a particular degree of 98–100. Comparison of the current variable data is thus made by determining in which range of values the current data falls and assigning the associated degree to the variable data.

Once the degrees are assigned to the variable data, the processor selects character strings from a file stored on the fixed disk storage device associated with the various degrees. The character strings then are sorted in a suitable order and, if desired, certain character strings are eliminated as redundant or otherwise undesirable.

BRIEF DESCRIPTION OF THE DRAWINGS

A better understanding of the present invention can be obtained when the following detailed description of the preferred embodiment is considered in conjunction with the following drawings, in which:

FIG. 3 includes the interpretative text generated by the host computer of FIG. 1 for the stock shown in FIG. 2;

FIGS. 4A–4H is a "degree value" input file containing a list of financial indicators with boundaries to establish the various degrees for each indicator;

FIGS. 5A–5E shows a portion of a "text item" input file containing text items for various indicator-degree combinations;

FIG. 6 is an "order" input file containing information relevant to how the text items from the "text item" input file are to be ordered by the host computer when generating the text items to provide to the user computers;

FIG. 7 shows the preferred method for "parsing" the "degree value," "text item," and "order" input files into various buffers;

Figure 1:
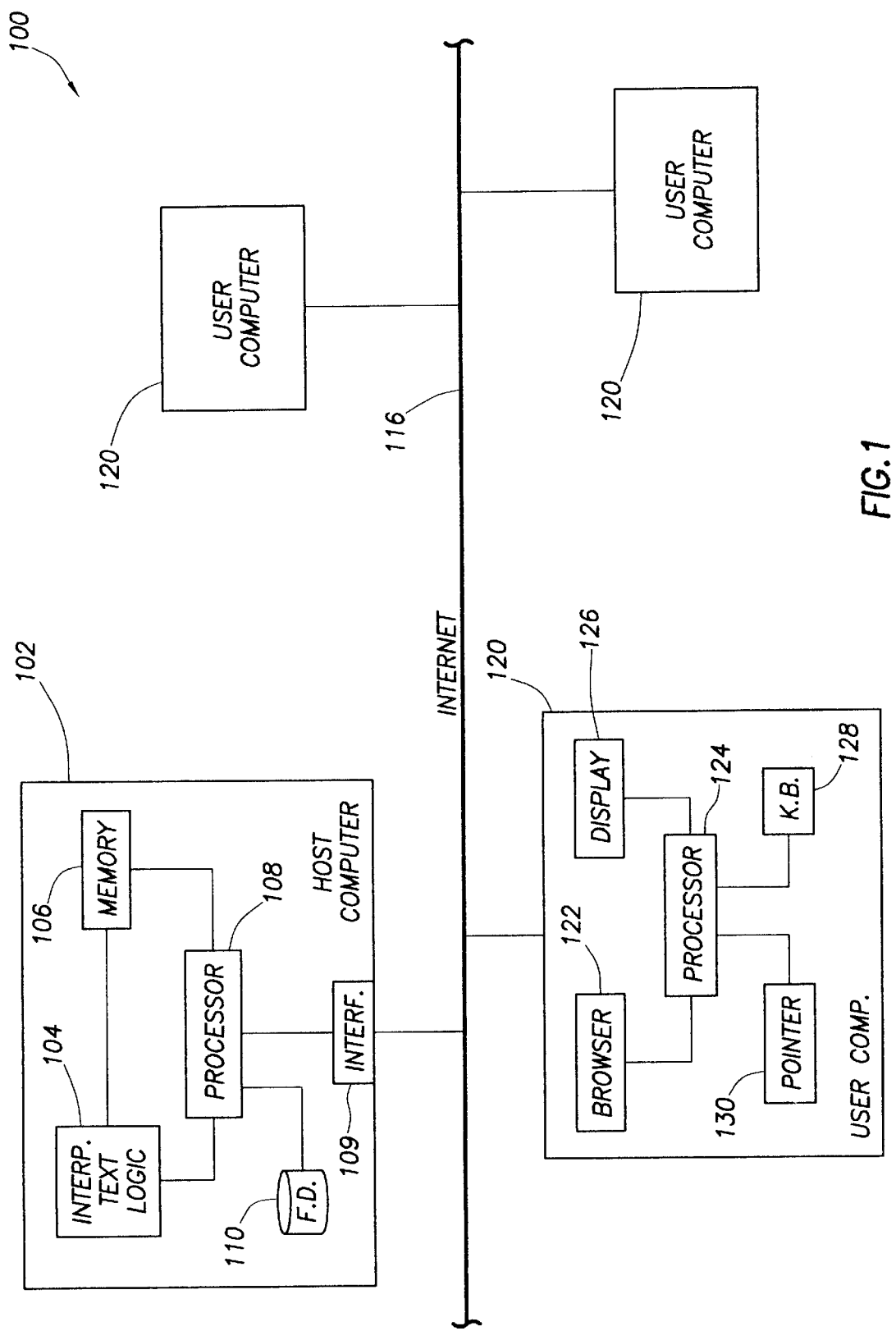
FIG. 1 is a block diagram of a preferred embodiment of the invention including host computer with interpretative text logic coupled to one or more user computers via a network connection.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

In addition, certain terms are used throughout the following description and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ".

Furthermore, the present invention is described in the context of a system for providing information related to financial security (e.g. stock) information. It should be understood that the principles of the present invention are not so limited and can be used in any system in which financial data of any type is being tracked and commented upon by an analyst. In fact, the present invention may be used in any area in which securities, commodities, or other investment instruments are being bought and sold and prices in a continuously changing environment. Moreover, the invention can by used in any context in which text can be presented to explain variable data. Examples include geophysical and medical data interpretation. The present invention has immediate application to these related areas, as one skilled in the art will understand.

DETAILED DESCRIPTION OF THE PREFERRED EMBODIMENTS

Referring now to FIG. 1, an interpretive text system 100 preferably comprises a host computer 102 coupled through a network connection 116 to one or more user computers 120. The host computer 102 transmits information to, and receives requests for information from, one or more user computers 120 by way of the network connection 116. The network connection 116 can be any suitable communication link and preferably is an on-line communication link such as the Internet as shown in FIG. 1. The host computer 102 includes a suitable interface 109 (e.g., a modem or network interface card) for connection to the communication link 116. The network connection 116 also can be implemented as an "extranet," local area network ("LAN"), wide area network ("WAN"), wireline communication link, satellite communication link or any other type of communication link that can function to facilitate the communication of information between the host computer 102 and user computers 120. In accordance with the preferred embodiment shown in FIG. 1, the interpretive text system 100 is implemented as an Internet host computer 102 to which users, via the user computers 120, access a web site hosted by the host computer 102. Alternatively, however, the interpretive text principles described herein can be implemented on any of the user computers. Further, the Internet hosting and processing functions performed by the host computer 102 may be implemented on a plurality of host computers such as the Presario 5695 manufactured by Compaq Computer Corporation.

As shown in FIG. 1, the host computer 102 includes one or more processors 108 coupled to interpretive text logic 104, memory 106 and a fixed disk (FD) storage device 110. The processor 108 comprises any suitable processor such as a Pentium III manufactured by Intel Corporation. The interpretive text logic 104 preferably is implemented in software that is executed by the processor 108 or may be implemented as logic distinct from the processor 108. The memory 106 preferably comprises any suitable type of memory such as conventional dynamic random access memory ("DRAM"), synchronous DRAM ("SDRAM"), extended data output DRAM ("EDO DRAM") and the like. The fixed disk storage device 110 may include any suitable storage device such as a hard disk drive, CD ROM drive, or DVD drive.

The user computers 102 include a processor 124, such as a Pentium III microprocessor manufactured by Intel, operatively coupled to a display 126, a keyboard 128, and a pointing device 130 (e.g. a mouse or touchpad). In addition, user computers 120 include web browser software 122 which is executed by the processor 124. A user can access the web site hosted on the host computer 102 using the web browser 122. The web browser can be any suitable browser such as, for example, Internet Explorer provided by Microsoft Corp. or Netscape Navigator by Netscape.

The interpretive text system 100 provides textual information to a user that "makes sense" of technical data that the user might not otherwise understand and be able to use. For example, a person might want to invest in various securities such as stocks, bonds, and mutual funds, but does not have the financial background to critically evaluate the volume of technical financial data that is readily available for each security. Thus, the interpretive text system 100 can be used to provide such a user a "plain English" explanation of the technical data, thereby permitting the user to make more informed investment decisions. Further, the interpretive text system 100 automatically generates the plain English text interpretation of the technical data upon request by the user. The preferred embodiment of the interpretive text system 100 is discussed below in the context of interpreting financial data associated with investment securities. The interpretive text system 100, however, can also be configured for use in many other contexts such as the interpretation of income statements, balance sheets, geophysical data, and medical data associated with a patient.

Figure 2:
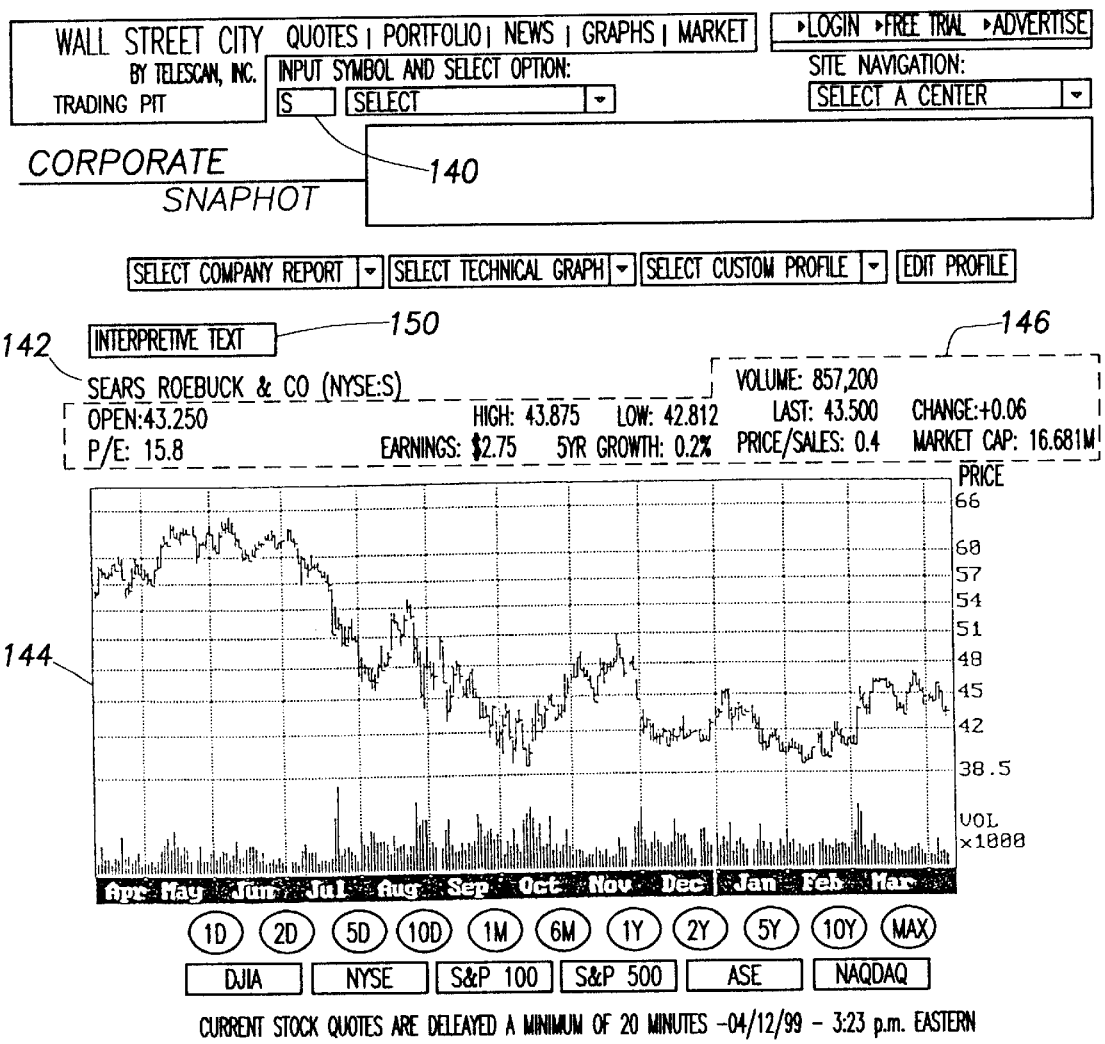
FIG. 2 is a Web page showing financial information associated with a stock and an interpretative text selection feature.

Referring now to FIGS. 1–3, an exemplary use of the interpretive text system 100 will now be described. In FIG. 2, a printout of an Internet web page is shown. Preferably, the host computer 102 (FIG. 1) provides HyperText Markup Language (HTML) data representing the web page which is received by the browser 122 on a user computer 120, where the web page is displayed on a monitor 126. In input box 140, the user, preferably using the pointing device 130 and keyboard 128, identifies a stock symbol. In FIG. 2 the stock symbol "S," (denoting Sears Roebuck & Co. as shown in text field 142), has been typed into input box 140. In response, the host computer 102 provides various items of financial information for Sears, such as the price history data shown in exemplary graph 144 and other financial technical data 146. Numerous other financial data could be displayed as well.

In accordance with the preferred embodiment, the user also is provided with a selectable button 150 labeled "Interpretive Text." When the Interpretive Text button 150 is selected, preferably by "clicking" on the button with the pointer device 130, the host computer 102 responds by automatically generating financial interpretive text such as the text 160 shown in FIG. 3. Other selection mechanisms besides selection button 150 shown in FIG. 2 are also possible. Further, the generation of interpretive text can be automatically initiated after a security symbol is entered in the input box 140 (i.e., no selection mechanism is provided).

The financial interpretive text 160 shown in FIG. 3 is text generated by the host computer 102 after analyzing one or more financial variables. The interpretive text 160 of FIG. 3 provides one possible explanation of the various financial variables to a lay investor. The following discussion explains how the interpretive text system 100 of the preferred embodiment to automatically generates interpretive text upon request by a user.

Any security can be characterized by one or more variable data items. The variable data preferably includes data names and associated data values. Throughout this disclosure, the variable data is referred to as "indicators" which comprise indicator names and associated indicator data values. Examples of such variable data, or "indicators," include an "Analyst Rank" of 85 or a "Long Term Growth Rank" of 75. The interpretive text system 100 can monitor and evaluate any number of such indicators and automatically generate interpretive text appropriate for the current state or values of the indicators. Preferably, the interpretive text system 100 monitors and evaluates a subset of all of the possible indicators relevant for analyzing financial securities. The interpretive text system 100 is programmed or otherwise provided with a list of indicators to use when generating interpretive text.

In accordance with the preferred embodiment, the interpretive text system 100 receives the list of relevant indicators in the form of an input file, such as the "Degree Value" (Degval) input file shown in FIGS. 4A–4H. As shown, the Degval file contains a list of indicator names 170. Examples of the indicator names 170 are "Analyst_Rank" and "Fundamental_Rank." Each indicator name 170 can take on a range of indicator values. For example, Analyst_Rank typically is in the range of 0 to 100. This indicator reflects how analysts rate a particular security. For example, if security A has an Analyst_Rank of 80 and security B has an Analyst_Rank of 90, security B generally is considered by the analysts following it to be a better investment value.

For each indicator name 170, the Degval file divides the possible range of values for that indicator into two or more "degrees." For example, an indicator could be divided into degrees of "high," "medium" and "low." By converting the range of indicator values into relative degrees, it becomes easier and more efficient to compare different indicators to one another for generating interpretive text for the user. In accordance with the preferred embodiment, the Degval file shown in FIGS. 4A–4H divides each indicator into seven degrees 174 summarized in Table I below.

TABLE I

INDICATOR DEGREE SUMMARY

| Degree | Description | Percentage Rank |
|---|---|---|
| +3 | Superb | 98–100 |
| +2 | Great | 91–97 |
| +1 | Good | 71–90 |
| 0 | Fair | 31–70 |
| −1 | Mediocre | 11–30 |
| −2 | Poor | 4–10 |
| −3 | Terrible | 1–3 |

The seven degrees are integers ranging from −3 to +3. A degree of +3, for example, is assigned to an indicator that has a value of 98–100 indicating that this indicator is "superb" for the associated security. As shown, a +2 degree is assigned to an indicator whose value is in the range 91–97 indicating a "great" characterization of the security. A +1 degree (range from 71–90) indicates "good" performance. For indicator whose values are in the range of 31–70, a 0 degree is assigned indicating a "fair" performance. The −1, −2, and −3 degrees reflect "mediocre," "poor," and "terrible" performances, respectively, in the ranges indicated.

The percentage ranks in Table I are exemplary only and can be set differently for different indicators. Further, some indicators are not easily reduced to conveniently bounded ranges. Price, for example, has a lower limit of 0, bus has no upper bound. Additionally, any number of indicator degrees greater than one can be used as desired.

The Degval file shown in FIGS. 4A–4H encodes the information shown above in Table I by including a list of indicator degrees 174 associated with each indicator name. Further, for each indicator degree 174, the range of values 176 defining each degree is specified. The range of indicator values defining the various degrees are referred to as "boundary" values or "boundary conditions." The range of indicator data values 176 includes a lower limit 178 and an upper limit 180. It should be noted that only five of the seven indicator degrees provided in Table I are explicitly included in the Degval file for each indicator. The five degrees 174 are +2, +1, 0, −1, and −2. The remaining two degrees, +3 and −3, are not explicitly included in Degval because the interpretive text logic 104 (FIG. 1) can easily determine that an indicator whose data value is greater than the upper limit 180 for the +2 degree should be assigned a degree of +3. Similarly, any indicator value less than the lower limit 178 for the −2 degree should be assigned a −3 degree. Accordingly, the Degval file is smaller (i.e., fewer bytes of information) than would otherwise result if all seven degrees and associated indicator data value ranges 176 were explicitly included in the file.

Referring now to FIGS. 5A–5E, another input file to the interpretive text system 100 is "Textitem." This file contains two or more plain English sentences from which the interpretive text logic 104 selects to automatically generate the interpretive text to provide to the user. The English sentences contained in Textitem are referred to throughout this disclosure as "text items." The text items shown in FIGS. 5A–5E reflect only a subset of all of the text items in the Textitem file in accordance with the preferred embodiment; FIGS. 5A–5E do not include a complete listing of all of the text items in Textitem. Text items can be complete sentences or fragments of sentences. The interpretive text logic 104 generated the exemplary interpretive text 160 of FIG. 3 by selecting appropriate sentences from the Textitem file based generally on the relative values of the various indicator degrees associated with Sears. The selection process will be described in greater detail below.

As shown, the Textitem file comprises a number of combinations of indicator names and indicator degrees ("indicator-degree combinations") and associated text items, such as indicator-degree combinations 184 and associated text items 186, 188, and 190 shown in FIG. 5A. All indicator-degree combinations in Textitem preferably are identified with a pair of asterisks (the symbol "*") before and after each combination. One of the indicator-degree combinations 184 in FIG. 5A includes the indicator "WWN_Momentum_Rank" and degree −3. A "terrible" rating for the WWN_Momentum_Rank generally indicates something that may be useful to an investor when making an investment decision or reviewing the status of a particular security. A plain English explanation of what a WWN_Momentum_Rank of −3 generally indicates is provided in each of the three text items 186, 188, 190 that follow the indicator-degree combination 184. Each text item 186–190 preferably provides the same information in different prose. When the interpretive text logic 104 (FIG. 1) is to select a text item associated with a WWN_Momentum_Rank of −3, the interpretive text logic 104 can select any one of the three text items 186–190. The interpretive text logic 104, for instance, may randomly select one of the three text items 186–190, rotate the order of selection among the three text items or select one of the three text items 186–190 in any other suitable fashion. By providing more than one text item for each indicator-degree combination and selecting different text items each time one of the text items is needed, the resulting interpretive text, such as interpretive text 160 shown in FIG. 3, advantageously appears to have been generated by a human, not a computer.

It should be noted also that the Textitem file need not have multiple text items for any particular indicator-degree combination 184. Thus, if desired, only one text item could be associated with an indicator-degree combination 184. Furthermore, if multiple text items are associated with an indicator-degree combination, any number of text items can be provided for the indicator-degree combination. For example, in FIG. 5B, the "Analyst_Rank +3 AND Fundamental_Rank −2" indicator-degree combination 194, which as noted below comprises a pair of indicator-degree combinations, has two text items 196 and 198 associated with it.

Considerable information can be gleaned from an analysis of the relevant indicators and their degrees. Much useful information can be discerned by comparing various indicator-degree combinations. For example, the "Analyst_Rank +3 AND Fundamental_Rank −2" indicator-degree combination 194 in FIG. 5B comprises a pair of indicator-degree combinations—one of the pair includes Analyst_Rank +3 and the other of the pair includes Fundamental_Rank −2. The combination of an Analyst_Rank of +3 in conjunction with a Fundamental_Rank of −2 indicates something about a security for which these indicators have the degrees indicated. That "something" is described in the plain English text items 196 and 198 following the indicator-degree combination pair 194. Thus, when Analyst_Rank is +3 and the Fundamental_Rank is −2 for a security, the interpretive text logic 104 preferably selects either text items 196 or 198 to provide to the user. Pairs of indicator-degree combinations can be combined in any manner such as through the use of the word "AND" or "OR" or any other suitable joining word or words. Although indicator-degree combination pair 194 in FIG. 5B includes two indicator-degree combinations, any number of indicator-degree combinations could also be included. The indicator-degree character strings 184, 194 in FIG. 5 are referred to throughout this disclosure as "indicator-degree combinations" with the understanding that each combination may include any number, including one, of indicator-degree strings.

The exemplary Degval file shown in FIGS. 4A–4H includes 61 indicators. With 61 indicators each having potentially seven degrees, there are millions of ways in which to combine the various indicator-degree combinations (e.g., Analyst_Rank +3 AND Fundamental_Rank −2; Analyst_Rank +2 AND Fundamental_Rank 0, etc.). However, relatively few of the total possible indicator-degree combinations actually provide any relevant information about a particular security. Thus, in accordance with the preferred embodiment, only text items for information bearing indicator-degree combinations are included in the Textitem input file. Further, some combinations of indicator-degree combinations may provide more pertinent information than other combinations. Accordingly, if desired, the number of text items in Textitem can be reduced even further by only including the more pertinent indicator-degree combinations. For example, a degree of 0 means that the associated indicator has a "fair" rating. Any information associated with degree 0 may not be nearly as interesting to a lay investor as information associated with a degree of +3, +2, −2, or −3. Thus, if desired textual information can be omitted from Textitem for less pertinent indicator-degree combinations.

As the interpretive text logic 104 examines various indicator-degree combinations for a particular security and selects appropriate text items, the selected text items will be provided to the user in a suitable order to give the interpretive text, such as interpretive text 160 in FIG. 3 the appearance of having been authored by a human. Some of the criteria for ordering the selected text items are provided in the Order input file shown in FIG. 6. The Order input file and the ordering process will be described more fully below.

Figures 4H, 7:
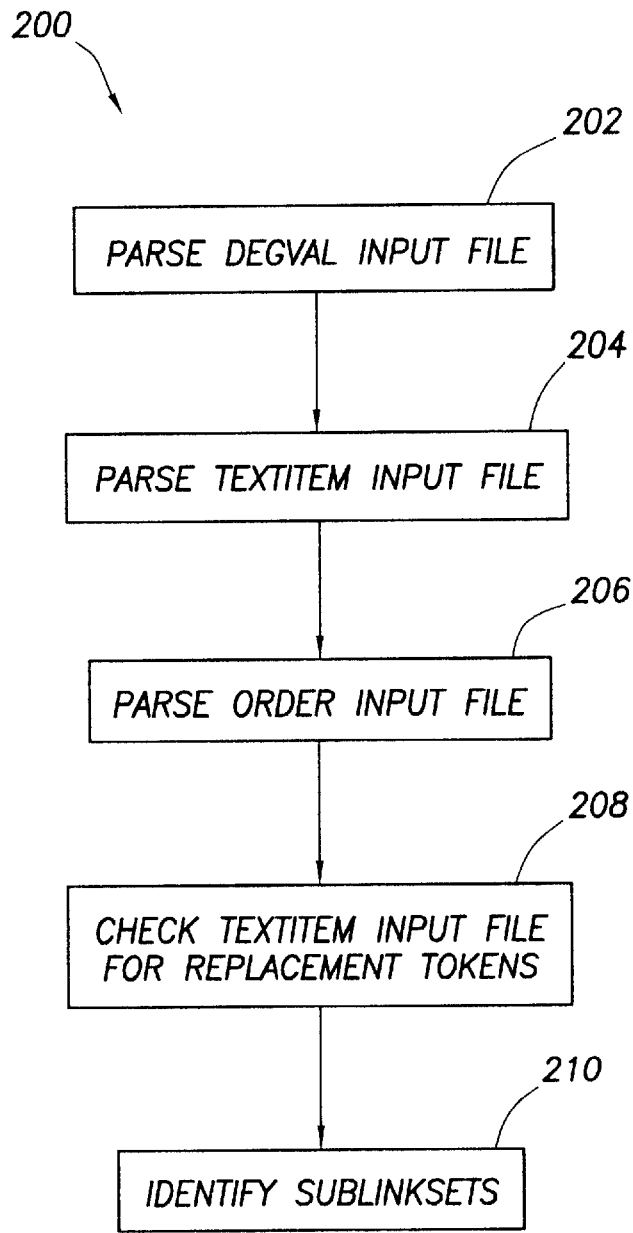

Referring now to FIGS. 1 and 7, the interpretive text system. 100 (FIG. 1) preferably performs an initialization process 200 (FIG. 7). In accordance with the preferred embodiment, the interpretive text logic 104 is implemented in software that runs on the processor 108 and the three input files shown in FIGS. 4–6, Degval, Textitem and Order, are stored on the fixed disk storage device 110. During initialization, which may occur at any desired time such as during initial system setup or when the input files are updated, the host computer 102 preferably executes the steps 202, 204, 206, 208 and 210 included in the initialization process 200. The steps 202–210, however, need not occur in the specific order shown in FIG. 7; the order of the initialization steps can be varied as desired.

Steps 202, 204, 206, and 208 involve scanning the three input files (Degval, Textitem, Order) and "parsing" the files into various data structures stored in memory 106. Parsing an input file means to "break apart" the file and copy components of the file to the various data structures. The various data structures are described in detail in FIGS. 8–12 and 14 and the associated text below. Parsing the input files into data structures stored in memory permits the host computer 102 to access subsequently the information more rapidly than obtaining the information from the files directly as needed.

Step 202 in initialization process 200 will now be described with respect to FIG. 8. In step 202 the host computer 102 (FIG. 1) parses the Degval input file by copying information from Degval into the DEG.VAL.TREE data structure shown in FIG. 8. The DEG.VAL.TREE data structure preferably is a binary tree structure known to those of ordinary skill in the art. As is commonly known, binary tree data structures have "nodes." Each node may be assigned a character string label identifying the node. Various data, addresses, or other types of information can be stored in memory assigned to, or otherwise associated with, each node.

The nodes in DEG.VAL.TREE are identified by reference numeral 220. Each node 220 includes a node identifier 222 which preferably is, or it is indicative of, an indicator name from the Degval input file. Four bytes of memory preferably are made available for storing the node identifier 222. A set of boundary values 224 are stored in memory associated with each node identifier 222. The boundary values 224 are, or are indicative of, the boundary values 176 from the Degval input file (FIG. 4A). As such, the boundary values 224 define or specify the various degrees for the associated indicator stored in DEG.VAL.TREE as node identifiers 222. The boundary values 224 include "+2 low boundary," "+2 high boundary," "+1 low boundary," "+1 high boundary," "0 low boundary," "0 high boundary," "−1 low boundary," "−1 high boundary," "−2 low boundary," and "−2 high boundary." Preferably, 40 bytes of storage are provided for storing each set of boundary values 224; four bytes are allocated for each boundary value in the set.

When the Degval parsing step 202 is performed during the initialization process 200, the host computer 102 scans the Degval input file for the asterisk symbols ("*") which identify the indicator names 170. As each indicator name string is read from Degval, the host computer 102 preferably adds a node 220 to DEG.VAL.TREE as shown in FIG. 8. The nodes 220 preferably are sorted in alphabetical order according to node identifier 222 (i.e., indicator name). After a node identifier 222 is written to DEG.VAL.TREE, the associated boundary values are stored in DEG.VAL.TREE as well. Parsing the Degval input file into the DEG.VAL.TREE binary tree data structure in memory 106 in this manner advantageously permits the host computer 102 to search quickly the boundary values 224 by indicator name 222 to determine the appropriate degree for a given indicator value.

The Textitem file parsing step 204 from FIG. 7 will now be described with reference to FIGS. 9–13. FIGS. 9–12 include various data structures that are loaded with information when the Textitem file is parsed. The preferable size (in bytes) of the various fields of each data structure is shown in FIGS. 9–12, although the field sizes can be varied. FIGS. 13A and 13B include a suitable method of loading the data structures shown in FIGS. 9–12. The contents of the data structures will be discussed first followed by an explanation of how the data structures are used.

Figure 9:
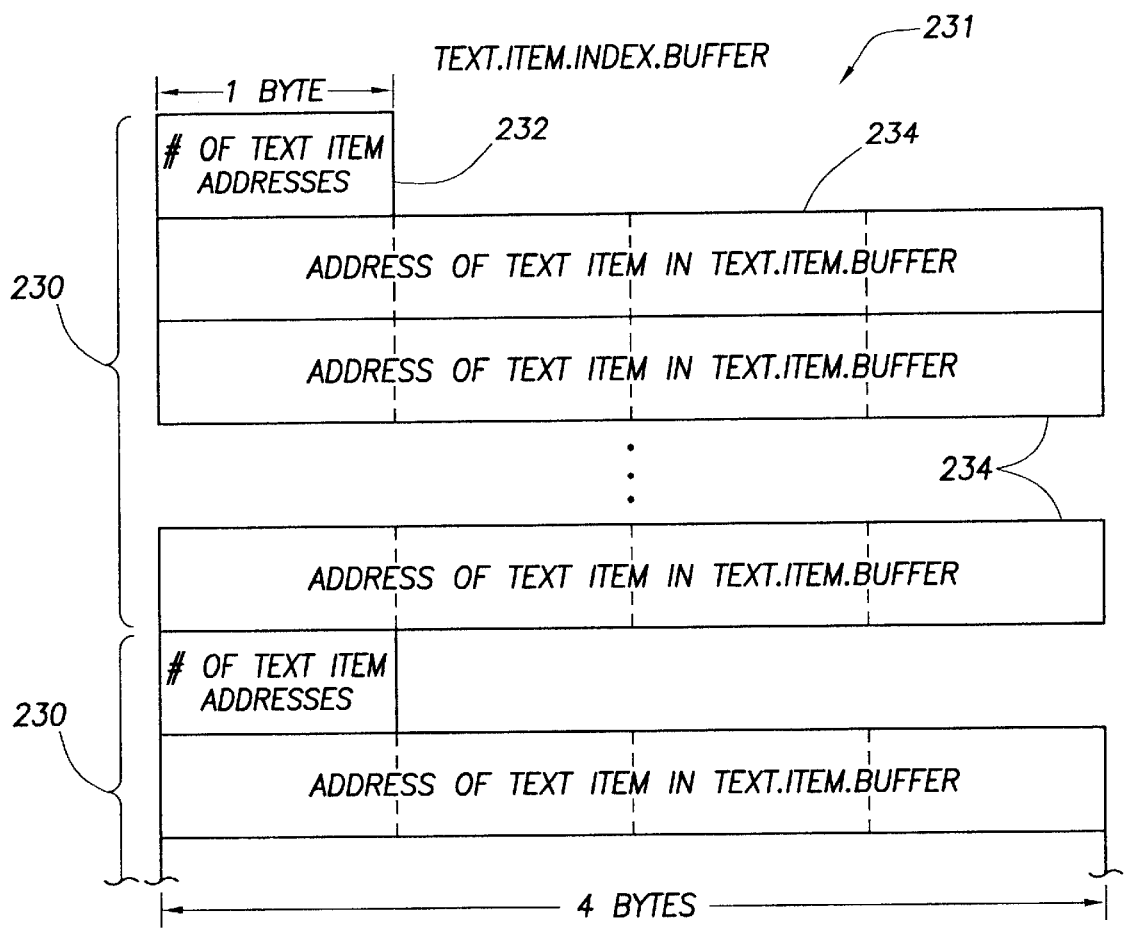
FIGS. 9 and 10 show the TEXT.ITEM.INDEX.BUFFER and TEXT.ITEM.BUFFER buffers, respectively, into which the text items from the "text item" input file are parsed.

Referring first to FIG. 9, the Text Item Index Buffer (TEXT.ITEM.INDEX.BUFFER) 231 is a buffer that includes a block 230 of varying size for each "linkset." A linkset refers to one or more indicator-degree combinations linked together. It should be understood that a linkset can include a single indicator-degree combination and as such, a single indicator-degree combination in a linkset is not linked to another indicator-degree combination. Linksets will be described further with regard to FIG. 12.

Figure 10:
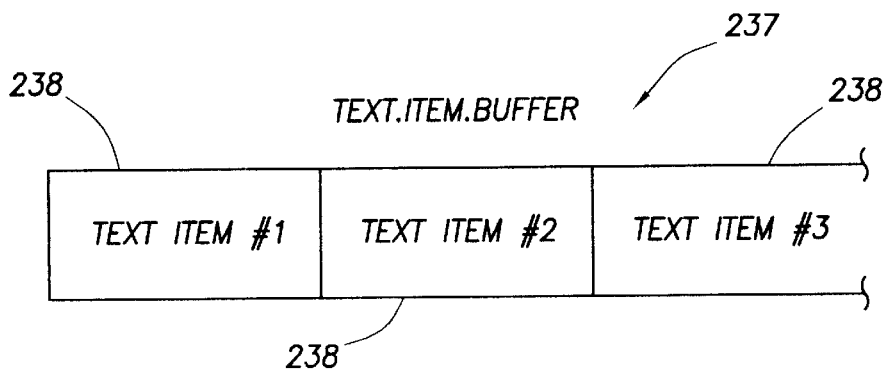

The TEXT.ITEM.INDEX.BUFFER buffer 231 generally includes a plurality of blocks 230. Each block 230 includes a one byte value 232 which represents the number of text item addresses 234 associated with that block. The text items are stored in text item buffer (TEXT.ITEM.BUFFER) 237 which is shown in FIG. 10 as a series of character strings 238. Each character string preferably contains one text item from the Textitem input file and has an associated address (not shown). The addresses of the text item character strings 238, stored in TEXT.ITEM.BUFFER 237 are the addresses stored in the blocks 230 in the TEXT.ITEM.INDEX-.BUFFER buffer 231.

Figure 11:
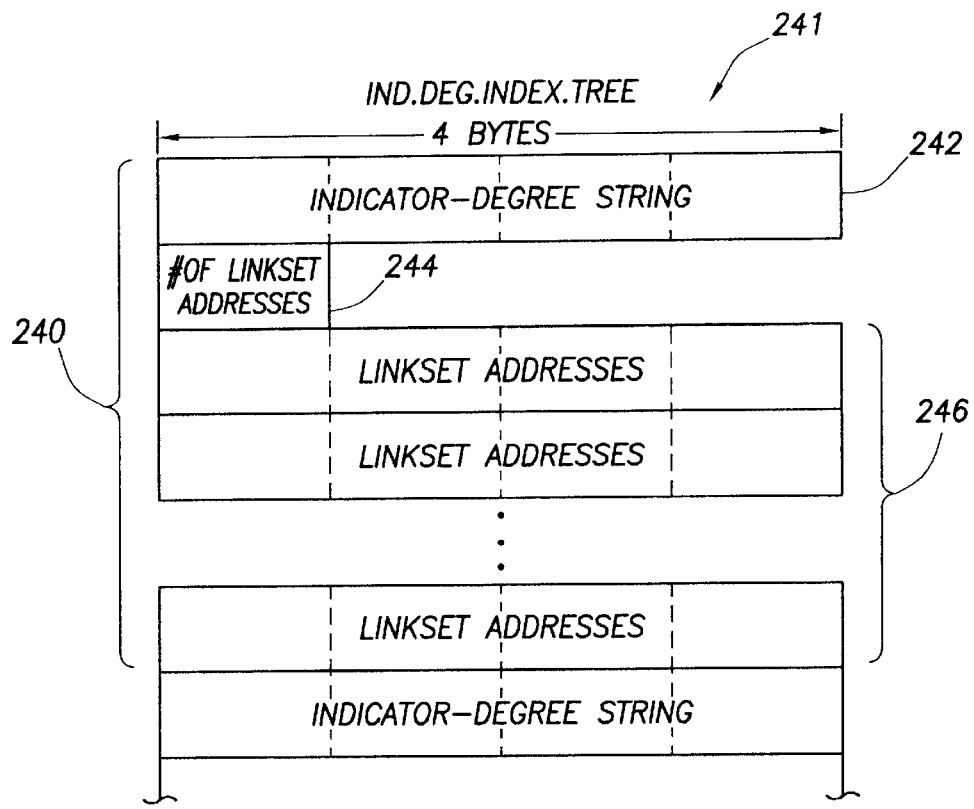
FIG. 11 shows the IND.DEG.INDEX.TREE binary tree into which data from the "degree value" input file is parsed and pointers to linksets are included.
Figure 12:
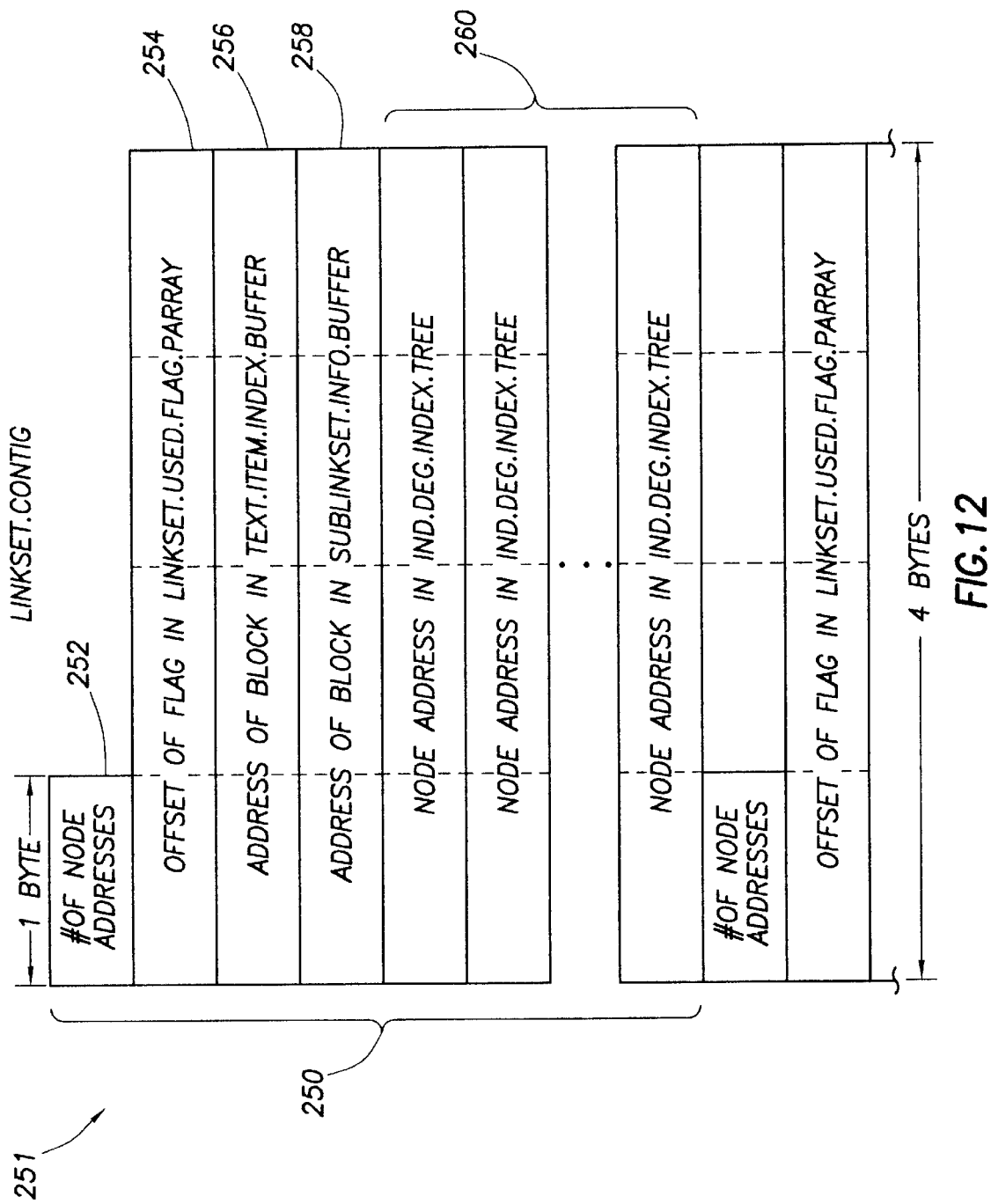
FIG. 12 shows the LINKSET.CONTIG buffer into which indicator-degree combinations from the "text item" input file are parsed and pointers to associated indicator-degree combinations in the IND.DEG.INDEX.TREE are included.
Figure 13A:
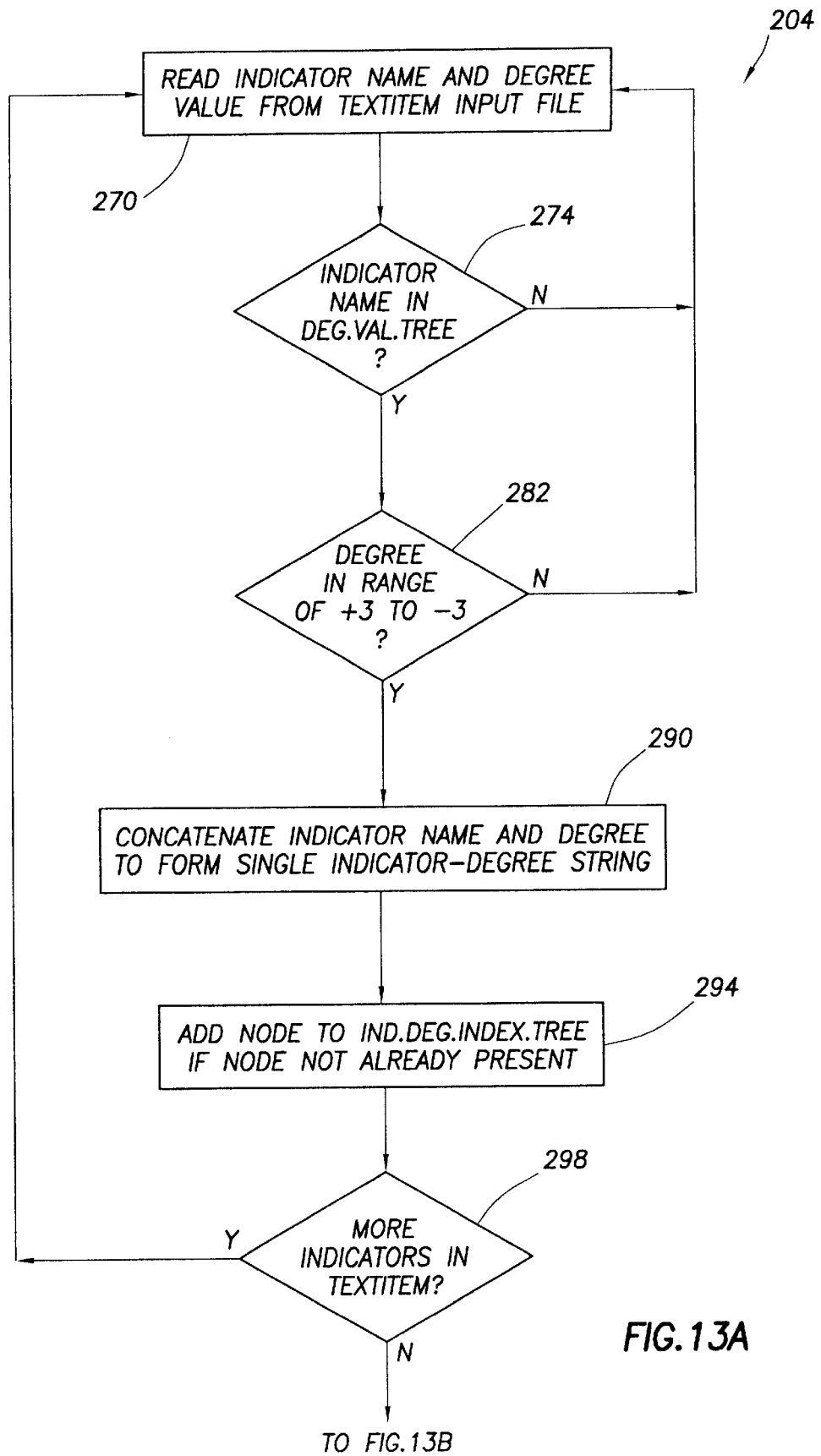
FIGS. 13A–13B show a preferred method for parsing the Textitem input file.
Figure 13B:
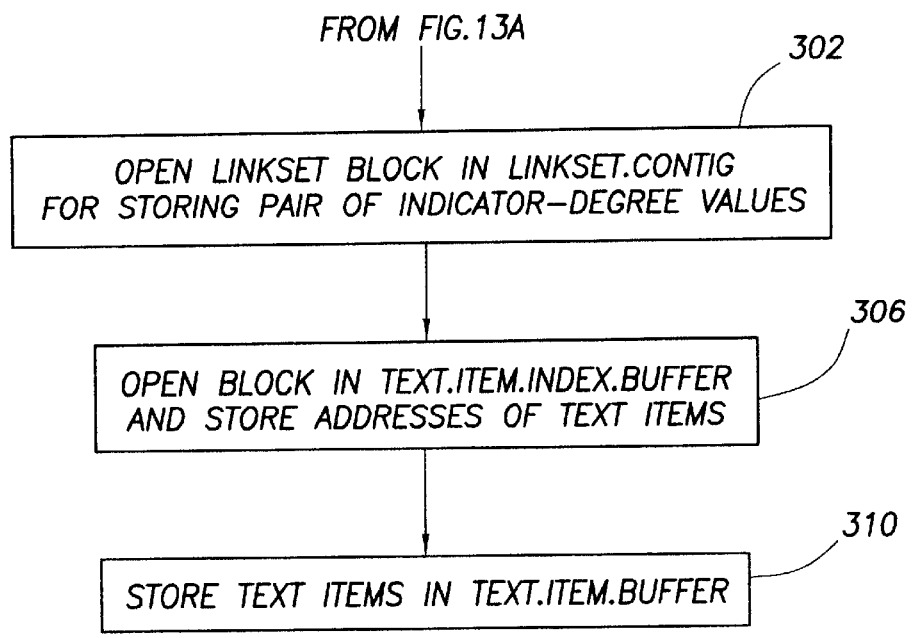

Referring now to FIGS. 11 and 12, an indicator degree index tree (IND.DEGREE.INDEX.TREE) 241 and a linkset "contig" (LINKSET CONTIG) 251 data structures are shown in accordance with the preferred embodiment. A "contig," an abbreviation for "contiguous," is an area of memory that is physically contiguous (i.e., byte n+1 immediately follows byte n). The IND.DEGREE.INDEX.TREE 241 is a binary tree that includes one or more nodes 240 with each node containing an indicator-degree string 242 (e.g., "Analyst_Rank +3") and a one byte value 244 specifying the number of linkset addresses 246 in the node. Each linkset address 246 is the address of a linkset block 250 (FIG. 12).

Figure 25:
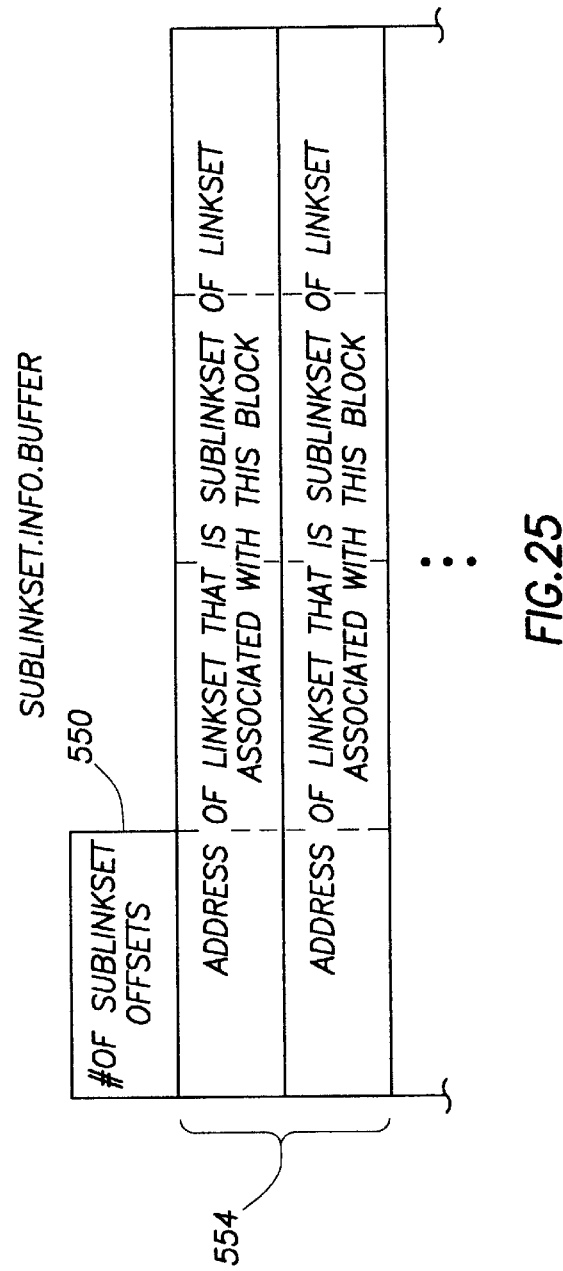
FIG. 25 shows a SUBLINKSET.INFO.BUFFER used to identify redundant sublinksets.

Referring to FIG. 12, LINKSET.CONTIG 251 contains one or more blocks 250 of variable length for each linkset of indicator-degree pairs (e.g., "Analyst_Rank +3 AND Fundamental_Rank −2"). A linkset thus refers to one or more indicator-degree strings from IND.DEG.INDEX-.TREE 241. Each block 250 includes a value 252 that specifies, or is otherwise used to determine, the number of IND.DEG.INDEX.TREE indicator-degree string addresses 260 contained in the block 250. Each indicator-degree string address block 250 points to a node 240 in IND.DEG.IN-DEX.TREE that has an indicator-degree string 242 represented in the linkset. For example, a linkset representing the indicator-degree combination pair "Analyst_Rank +3 AND Fundamental_Rank −2" will have two node addresses 260. One address points to the IND.DEG.INDEX.TREE node containing the indicator-degree string "Analyst_Rank +3." The other address points to the IND.DEG.INDEX.TREE node containing "Fundamental_Rank −2." Each block 250 also includes a number of additional 4-byte values 254, 256, and 258. Value 254 preferably is an offset value to a flag in the Linkset Used Flag Port Array (LINKSET.USED.FLAG.PARRAY) buffer 332, discussed below with respect to FIGS. 15 and 17. Value 256 is an address to a block 230 in TEXT.ITEM.INDEX.BUFFER (FIG. 9) and value 258 is an address to a sublinkset block in the sublinkset information buffer (SUBLINKSET.INFO.BUFFER) shown in FIG. 25.

Referring now to FIGS. 13A and 13B, a preferred embodiment of the Textitem parsing step 204 (FIG. 7) is shown. FIGS. 13A and 13B should be examined with reference to the following explanation and the data structures of FIGS. 9–12. In step 270, the host computer 102 reads an indicator name and degree from the Textitem file. The host computer 102 determines in decision step 274 whether the indicator name read from Textitem is valid. This step preferably is performed by determining whether the indicator name is a member of the DEG.VAL.TREE binary tree described above with respect to FIG. 8. If the indicator name is not a member of DEG.VAL.TREE, the indicator name and degree and all text items from the Textitem input file that are associated with the indicator name are ignored and the program control loops back to step 270 in which the next indicator name and degree values are read from Textitem.

If the indicator name is found in DEG.VAL.TREE, however, then in decision step 282, the degree is examined to determine whether it is a valid value. In the context of the preferred embodiment, allowable degrees are integers in the range of +3 to −3 (i.e. +3, +2, +1, 0, −1, −2, −3). If the degree value is invalid, control passes to step 270 and the next indicator name and degree values are read. If the degree and indicator names are valid, in step 290, the valid indicator name and degree read from Textitem are concatenated, or otherwise combined, to form a single indicator-degree string.

In step 294, the host computer 102 then adds a node 240 to the IND.DEG.INDEX.TREE binary tree unless the node is already present (duplicative nodes preferably are not generated). Step 294 includes storing the concatenated indicator-degree string as value 242 in IND.DEG.INDEX.TREE. In decision step 298, the host computer 102 determines whether more indicator names and associated degrees are present in Textitem and, if so, loops back to step 270 to repeat the process.

Once all of the indicator names and degrees in Textitem have been processed, as determined by decision step 298, program control passes to step 302 in FIG. 13B in which the host computer 102 opens a linkset block 250 in LINKSET.CONTIG into which the relevant data shown in FIG. 12 will be stored. Further, in block 230 of TEXT.ITE-M.INDEX.BUFFER (FIG. 9) is opened by the host computer 102 in step 306 into which the addresses 234 are written. The text items, the addresses of which are written into TEXT.ITEM.INDEX.BUFFER, are stored in TEX-T.ITEM.BUFFER (FIG. 10) in step 310.

At this point, IND.DEG.INDEX.TREE 241 includes a node 240 for each unique indicator-degree combination. Each of these nodes 240 has a unique address. LINKSET-.CONTIG has a linkset for each set or pair of indicator-degree combinations. Each linkset has a unique address. Each linkset also contains the IND.DEG.INDEX.TREE node addresses that represent the indicator-degree combinations associated with the link set. Similarly, each node 240 in IND.DEG.INDEX.TREE has the address of all of the linksets for which the indicator-degree combination represented by the node is a member. This type of cross-referencing system permits quick and easy searches for all indicator-degree combinations that contain a particular indicator name as will be explained below.

Referring to FIG. 7, in step 208 the Textitem input file again is scanned this time for replacement "tokens." A replacement token is a symbol in a text item that should be replaced with an appropriate character string indicated by the particular symbol. For example, referring to FIGS. 5D and 5E, various replacement tokens 192 are shown. In accordance with the preferred embodiment, a replacement token is identified with the symbol "&&" preceding a reference label. The replacement token "&&CURRENT-QUOTE" indicates that the current price quote for the associated security (i.e., the security being analyzed for the user) should be substituted into that text item in place of the replacement token. By way of additional examples, "&&TICKER" refers to the ticker symbol for the associated security and "&&DAILYOPEN" refers to the daily opening price quote for the security. Using replacement tokens permits generic text items to be written that can apply to any security at any time. Any security specific information, such as current price, ticker symbol, or the opening day's price quote, can easily incorporated into the interpretive text during generation of the text.

Figure 14:
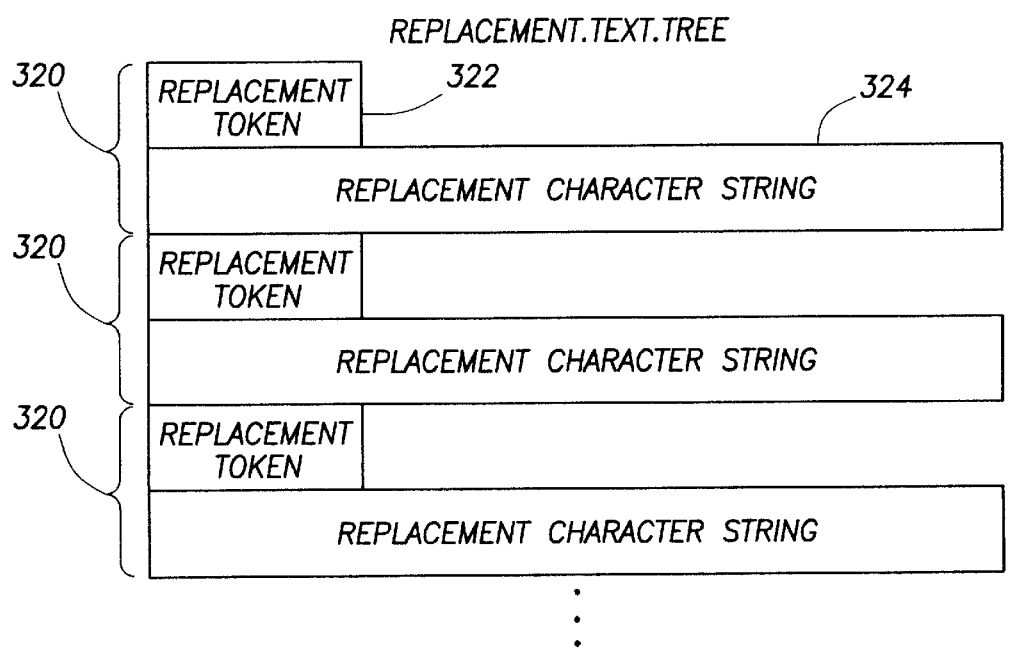
FIG. 14 shows the REPLACEMENT.TEXT.TREE into which replacement text strings are stored.

The host computer 102 in initialization step 208 checks the Textitem input file for replacement tokens. The host computer preferably scans the Textitem input file for replacement tokens, preferably identified with the symbol "&&.". When the host computer 102 encounters a replacement token, it adds a node to a Replacement Text Tree (REPLACEMENT.TEXT.TREE) binary tree data structure as shown in FIG. 14. Each node 320 includes a replacement token 322 and an associated replacement character string 324. The character string 324 can be any suitable length, but preferably is up to 30 characters in length.

Referring still to FIG. 7, the host computer preferably identifies "sublinksets" in step 210. Sublinksets are linksets in which every indicator-degree combination string is included in another single linkset. For example, the Analyst_Rank +2 text will repeat part of the contents of the Analyst_Rank +2 AND Fundamental_Rank –1 text. Thus, Analyst_Rank +2 is a sublinkset of Analyst Rank +2 and Fundamental_Rank –1 text. Sublinkset information is written into the SUBLINKSET.INFO.BUFFER shown in FIG. 25. This buffer includes a block for each linkset in LINKSET.CONTIG. Each block includes a value 550 specifying the number of sublinkset address offsets 554 that follow. Each sublinkset address offset 554 is used to calculate, or otherwise identify, a linkset address in LINKSET.PCONTIG that is a subset of the linkset associated with this block. By searching the SUBLINKSET.INFO.BUFFER, the host computer 102 can find sublinksets of a given linkset and eliminate the corresponding text item from being included in the interpretive text output.

Figure 15:
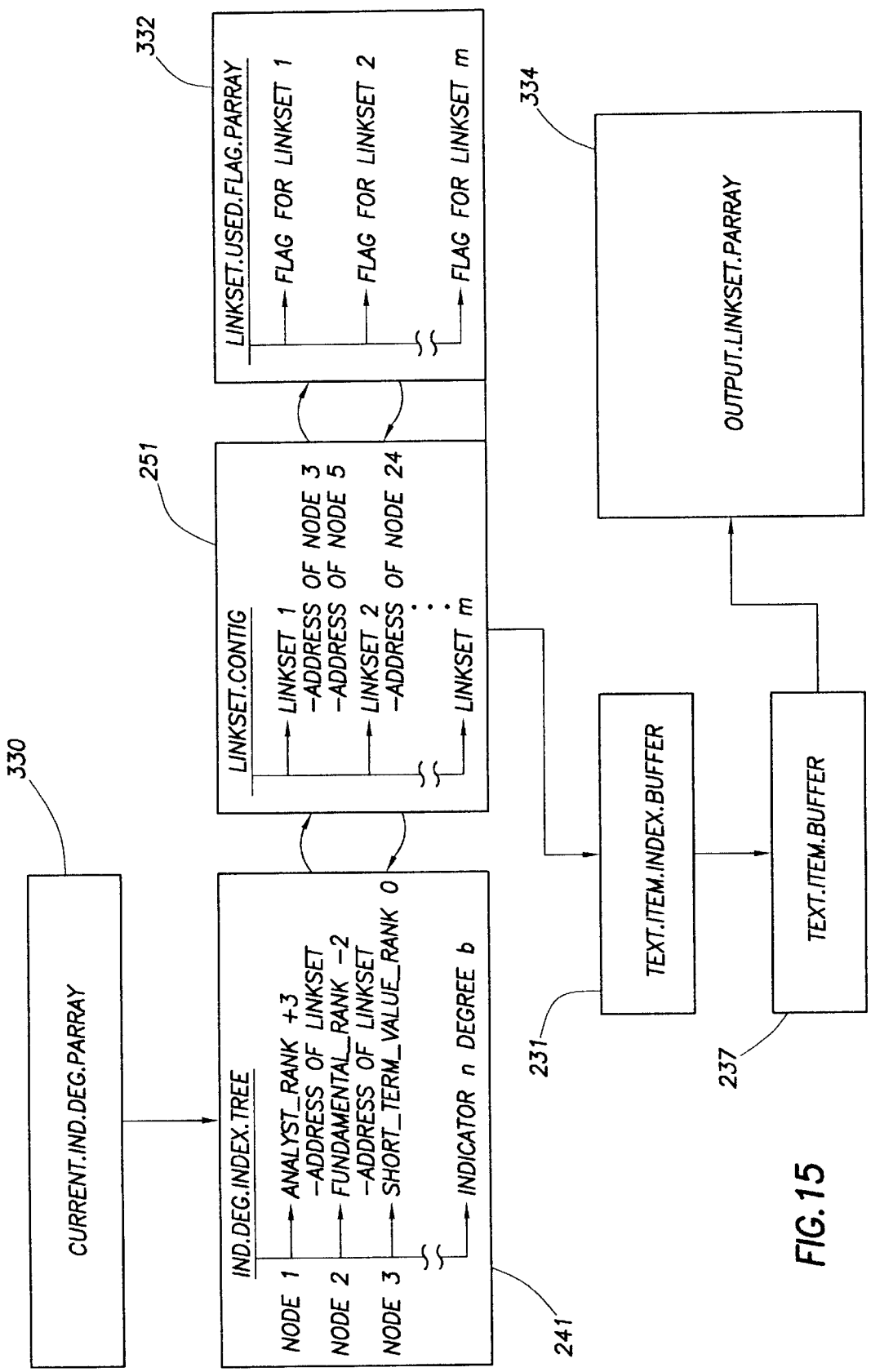
FIG. 15 is a diagram showing the relationships between the IND.DEG.INDEX.TREE, LINKSET.CONTIG, LINSET.USED.FLAG.PARRAY, TEXT.ITEM.INDEX.BUFFER, TEXT.ITEM.BUFFER, and OUTPUT.LINKSET.PARRAY data structures.

FIG. 15 depicts the general relationship between the various data structures described above. The TEXT.ITEM.INDEX.BUFFER 231, TEXT.ITEM.BUFFER 237, IND.DEG.INDEX.TREE 241, and LINKSET.CONTIG 251 have been described with reference to FIGS. 9, 10, 11, and 12, respectively. The Current Index Degree Port Array (CURRENT.IND.DEGREE.PARRAY) 330 is an array comprising the actual (i.e., up-to-date) indicator degrees for a security specified by a user (e.g., Analyst_Rank=87). The CURRENT.IND.DEG.PARRAY 330 may be programmed by a systems programmed or the user to include any desired set of indicators.

Referring to FIG. 2, when the user enters a security symbol in input box 140 to begin the generation of interpretive text, the host computer preferably accesses a database (not shown) that maintains current values for the various indicators specified in CURRENT.IND.DEG.PARRAY 330. The host computer 102 retrieves the up-to-date values for the indicators of the user-specified security, converts each indicator value to a degree using DEG.VAL.TREE (FIG. 8), and writes the resulting indicator-degree combinations into the CURRENT.IND.DEGREE.PARRAY 330 in the format shown in FIG. 16. The first entry 340 includes the number of indicator-degree strings (e.g., Analyst_Rank +3) included in the set of indicator-degree strings 342. Thus, CURRENT.IND.DEG.PARRAY 330 includes the up-to-date degrees for the indicators on which the interpretive text will be based.

Figures 17, 18:
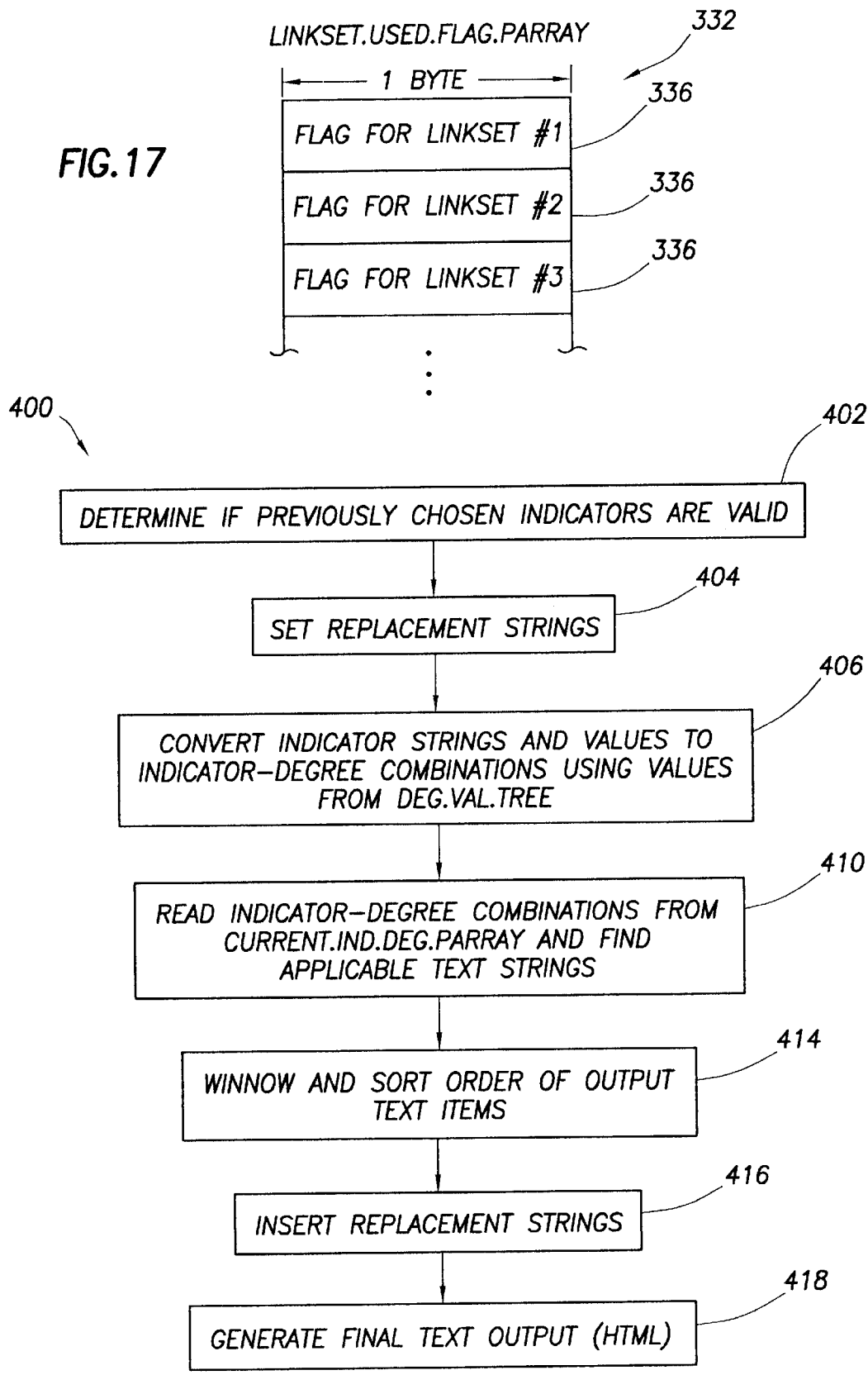
FIG. 17 shows the LINKSET.USED.FLAG.PARRAY buffer shown in FIG. 15.
FIG. 18 shows a preferred method for using the buffers shown in FIGS. 8–17 to select text items to generate the interpretative text to be provided to the user.

Referring again to FIG. 15, the linkset used flag port array (LINKSET.USED.FLAG.PARRAY) 332 includes a flag for each linkset in LINKSET.CONTIG 251. The preferred configuration for the LINKSET.USED.FLAG.PARRAY 332 is shown in FIG. 17. Each flag preferably is a one-byte value 336 that is set to a value of true or false, or functionally equivalent representations, to indicate whether the associated linkset has already been used in the current cycle as explained below.

Using the up-to-date indicator-degree strings from CURRENT.IND.DEG.PARRAY 330, the host computer, as explained below, generates interpretive text by selecting appropriate text items from TEXT.ITEM.BUFFER 237. Once text items from the TEXT.ITEM.BUFFER 237 have been selected, the host computer 102 writes those text items to the output linkset port array (OUTPUT.LINKSET.PARRAY) 334. From there, the various text items are further processed before being provided to the user in the form of interpretive text, such as interpretive text 160 (FIG. 3).

FIG. 18 shows a preferred method 400 for generating the interpretive text in response to a user specifying a particular security. Method 400 preferably is performed by the host computer 102 after the initialization process 200 (FIG. 7) is completed and, as such, method 400, if implemented in software, is referred to as a "runtime routine." Runtime routine 400 will now be described with reference to FIGS. 8–12 and 14–17.

It is assumed that for runtime routine 400 a list of indicators has already been chosen for generating the interpretive text. This list will include the indicators that the interpretive text logic 104 will examine when selecting text items from the TEXT.ITEM.BUFFER 237. Choosing the indicators can be by any suitable method such as hard coding the selected indicators into the runtime routine 400 or permitting the user to specify which indicators should be used by the interpretive text logic 104 to generate interpretive text.

In step 402, the host computer 102 determines whether the indicators previously chosen to be used in generating the interpretive text are valid or acceptable indicators. This step preferably is performed by comparing each indicator string in the previously chosen list to the indicator strings 222 (FIG. 8) in DEG.VAL.TREE parsed from the Degval input file. If a previously chosen indicator is not found in DEG.VAL.TREE, then that indicator will be ignored by the runtime routine 400.

In the next step, step. 404, the runtime routine. 400 sets or initializes the replacement strings in the REPLACEMENT.TEXT.TREE (FIG. 14). Some replacement tokens are global and refreshed every time (e.g., "&&TICKER," the company ticker symbol). Other replacement tokens are specific to certain text items or linksets and are only refreshed when, and if, needed. An example of such a token is "&&P/E" which is the company's price-to-earnings ratio.

Figure 8:
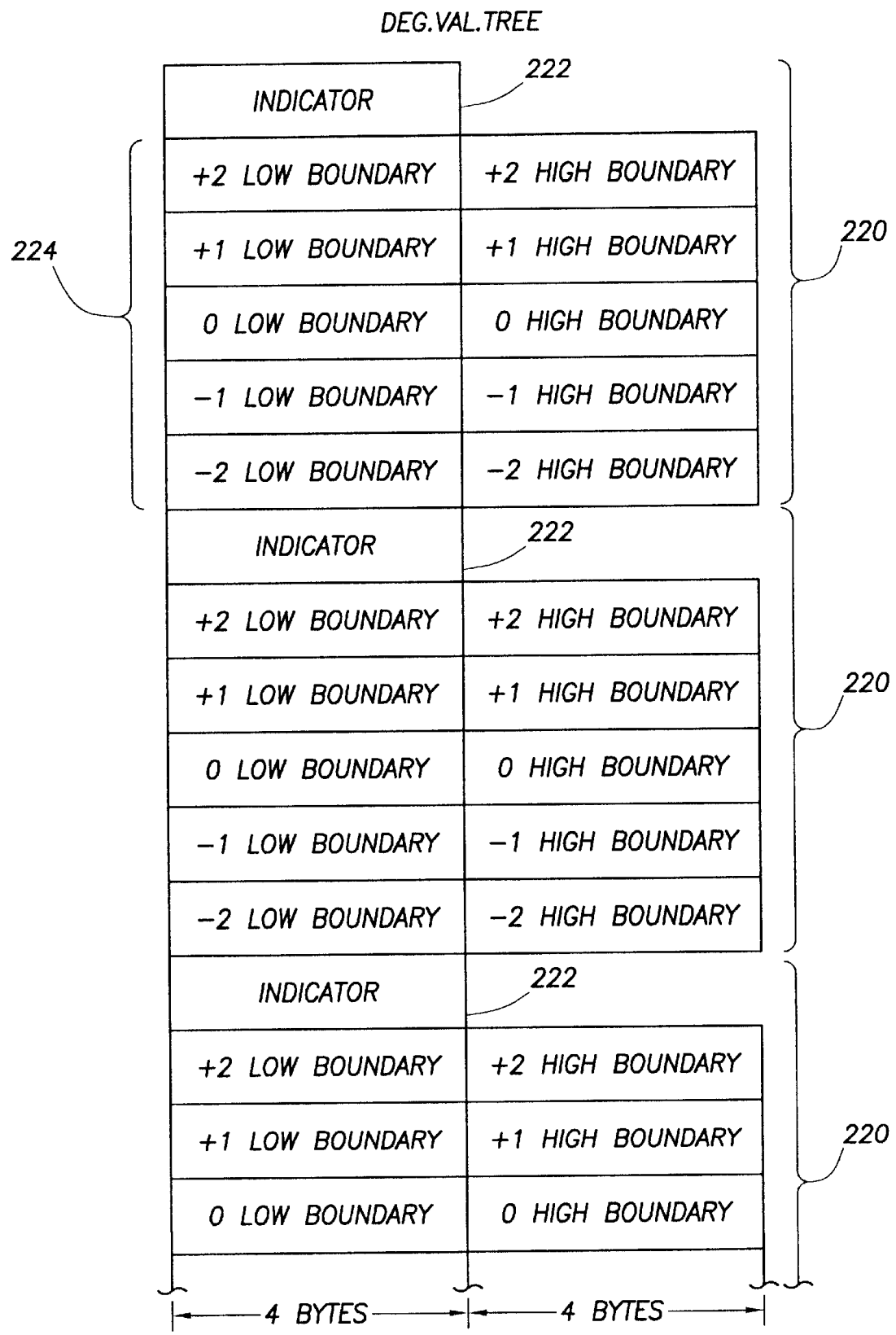
FIG. 8 shows the DEG.VAL.TREE binary tree buffer into which data from the "degree value" input file is parsed.
Figure 16:
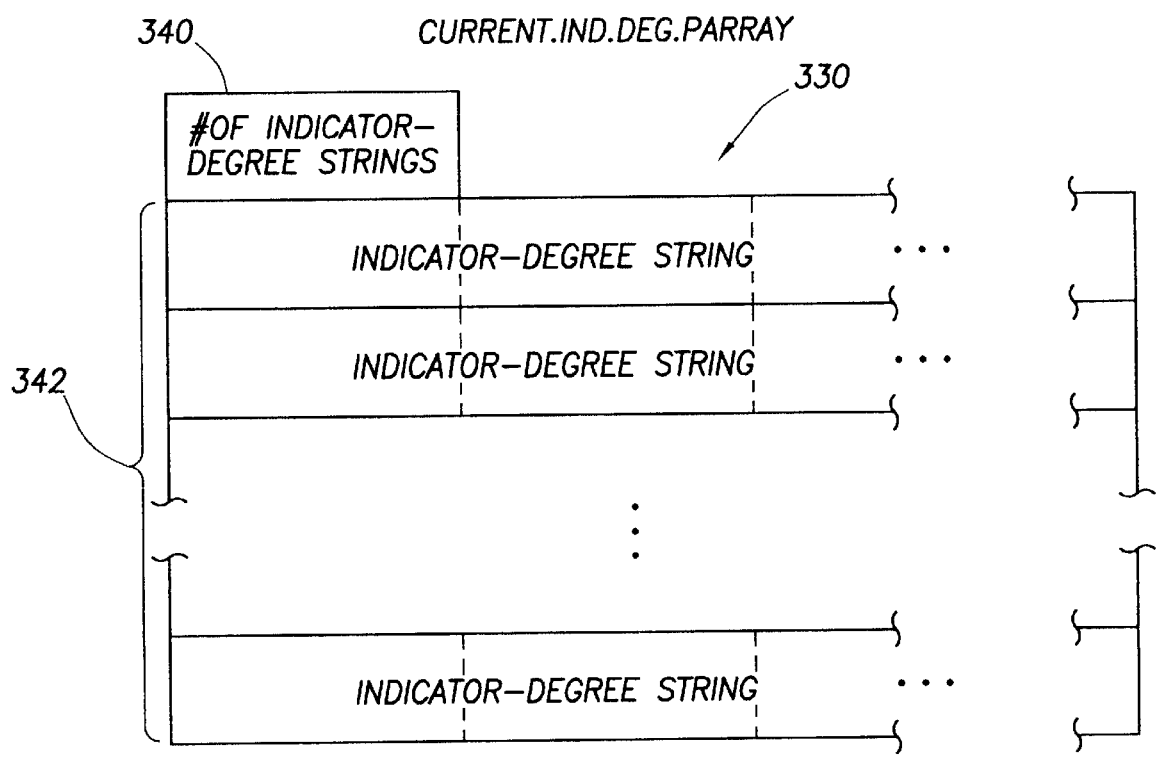
FIG. 16 shows the CURRENT.IND.DEG.PARRAY buffer which contains the current indicator values for a security selected by a user.

In step 406, the host computer 102 obtains the current values for each of the valid, chosen indicators from any suitable source of such information and converts the indicator names and associated values to indicator-degree combinations using the boundary values 224 included in DEG.VAL.TREE (FIG. 8). The resulting indicator-degree combinations then are written into the CURRENT.IND.DEG.PARRAY 330 (FIG. 16).

Figure 19:
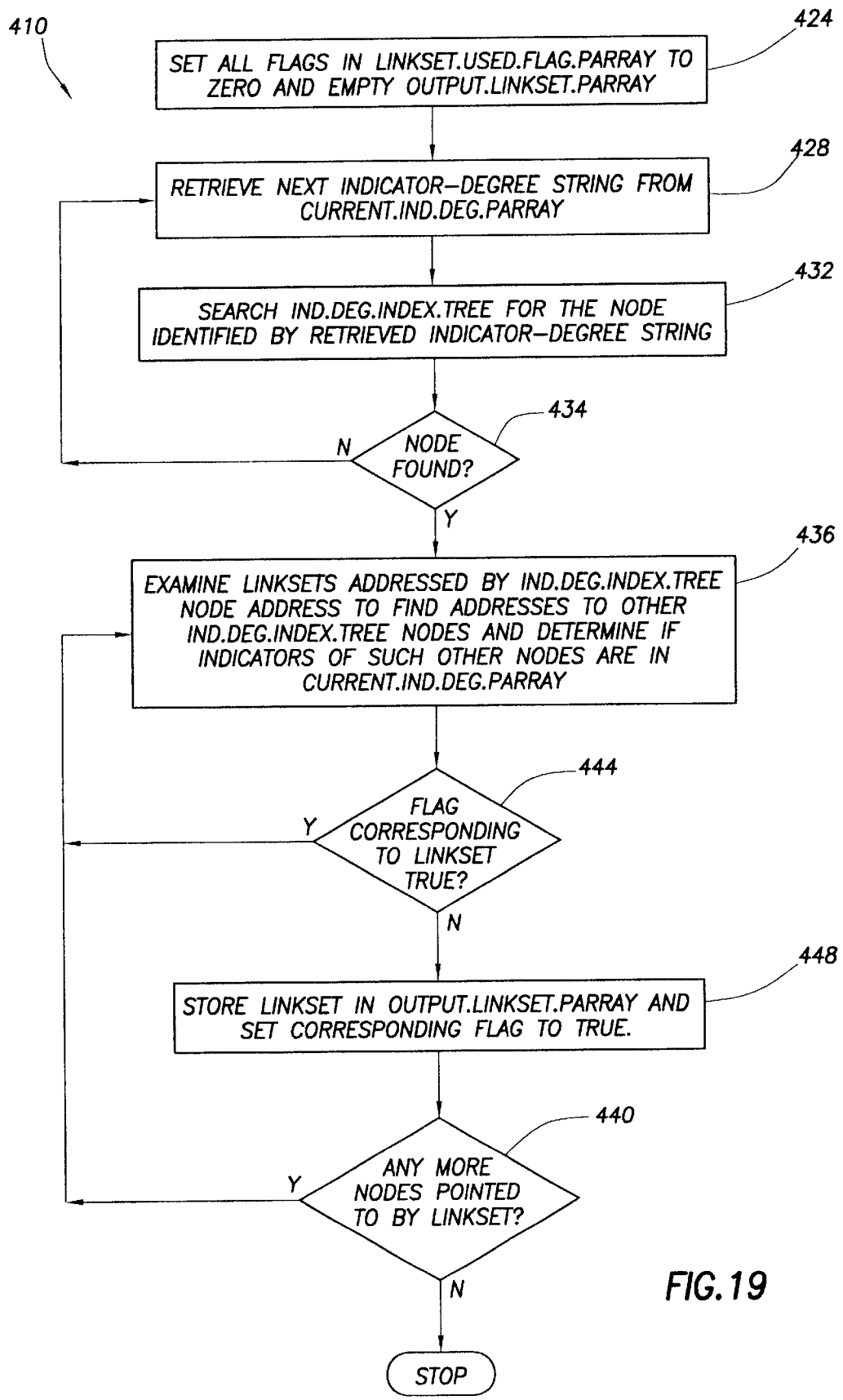
FIG. 19 provides a preferred method for searching the buffers to obtain appropriate text items to generate the desired interpretive text.

In step 410, the host computer 102 reads the indicator-degree combinations from CURRENT.IND.DEG.PARRAY 330 and searches for every applicable text item. FIG. 19 includes a preferred flowchart for step 410 and will be discussed shortly.

Once the host computer selects the applicable text items, those text items are then "winnowed" and sorted in step 414. Winnowing refers to scanning the selected group of text items and eliminating any unnecessary, redundant, or otherwise undesirable text items. Sorting refers to placing the resulting text items in a desired order for presentation on the user computer's display 126 (FIG. 1). Finally, in step 418 the host computer 102 uses the final set of ordered text items preferably to generate HyperText Markup Language ("HTML") code, or other suitable code or format, compatible with the user computer's browser 122. The user computer's browser 122 shows the interpretive text on the display 126 in accordance with commonly known techniques.

Referring now to FIG. 19, a preferred embodiment of step 410 is shown for searching the relevant data structures to select the appropriate text items from TEXT.ITEM.BUFFER 237 (FIG. 15). In step 424, the host computer 102 preferably sets all of the flags in LINKSET.USED.FLAG.PARRAY to "false" indicating that none of the linksets has been used to select a text item. In step 428, the next available indicator-degree combination from CURRENT.IND.DEG.PARRAY 330 is retrieved. Then, in step 432 the IND.DEG.INDEX.TREE 241 is searched for the retrieved indicator-degree combination. If no node is found in IND.DEG.INDEX.TREE 241 that matches the indicator-degree combination retrieved from CURRENT.IND.DEG.PARRAY 330 (decision step 434), control passes back to step 428 in which the next indicator-degree string is retrieved from CURRENT.IND.DEG.PARRAY 330. If, however, a node with a matching indicator-degree combination is found, then in step 436 preferably all of the linksets in LINKSET.CONTIG pointed to by the linkset address pointers in that node are examined for pointers to other nodes in IND.DEG.INDEX.TREE. then, using the indicator-degree strings 242 at such other nodes, the host computer 102 determines if those indicator-degree combinations are members of CURRENT.IND.DEG.PARRAY 330. In this manner, the host computer 102 identifies every linkset in which all indicator-degree combinations are present in CURRENT.IND.DEG.PARRAY 330.

Figure 20:
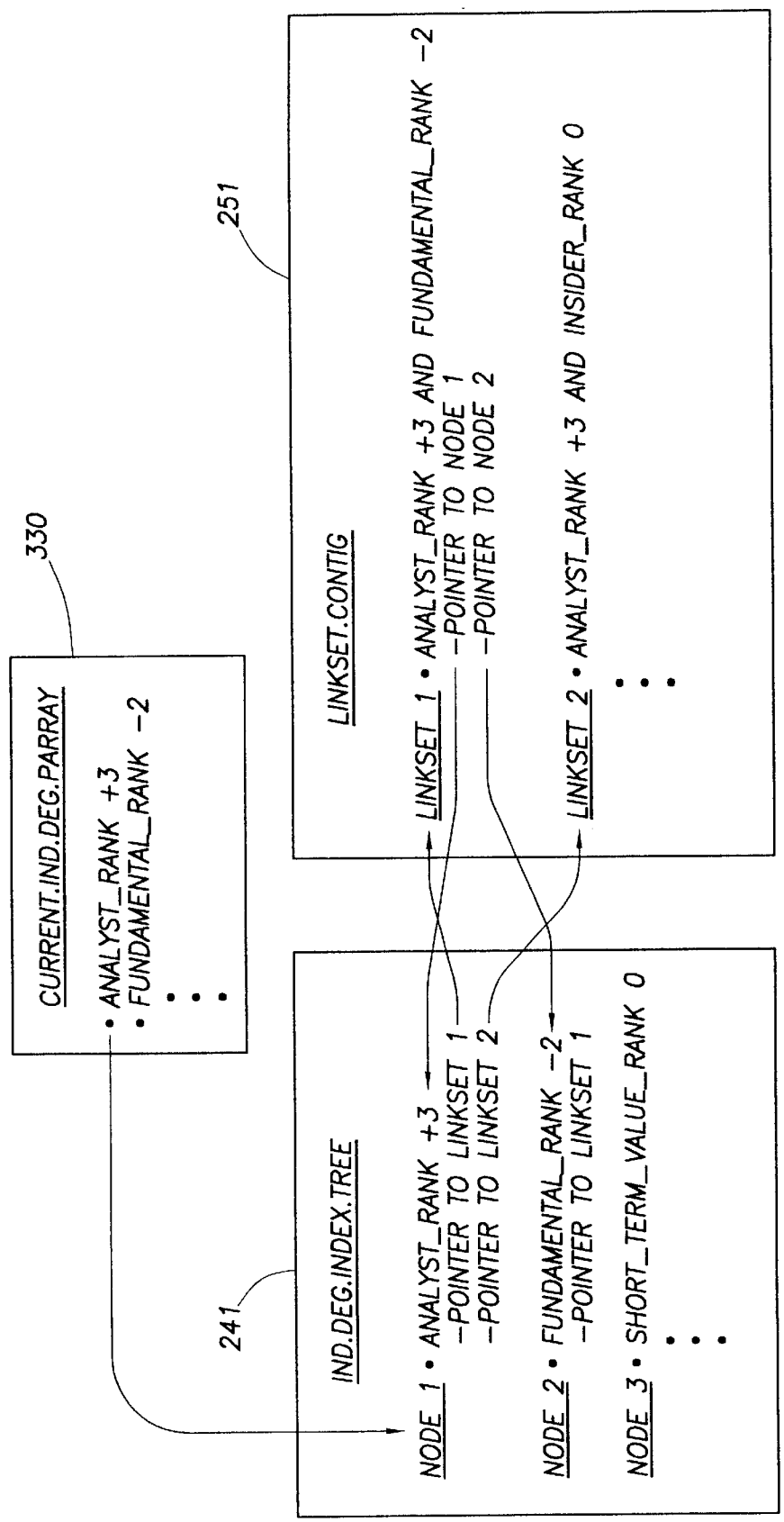
FIG. 20 shows an example using the CURRENT.IND.DEG.PARRAY, IND.DEG.INDEX.TREE and LINKET.CONTIG buffers.

By way of an example, in FIG. 20 the CURRENT.IND.DEG.PARRAY 330 includes the indicator-degree combinations "Analyst_Rank +3," "Fundamental_Rank -2," and others. The host computer 102 examines the first entry in CURRENT.IND.DEG.PARRAY 330 ("Analyst_Rank +3") and then determines whether a node exists in IND.DEG.INDEX.TREE 241 having an indicator-degree string 242 (FIG. 11) that matches Analyst_Rank +3. In this example, node 1 is just such a node. Node 1 includes linkset pointer addresses to linkset 1 and linkset 2 of LINKSET.CONTIG 251. Both of these linksets include the Analyst_Rank +3 indicator-degree combination as a member of a pair of indicator-degree combinations. Linkset 1 includes the pair "Analyst_Rank +3 AND Fundamental_Rank -2" and linkset 2 includes the pair "Analyst_Rank +3 AND Insider_Rank 0."

The host computer 102 then must determine whether the other members of these pairs, i.e., "Fundamental_Rank -2" and "Insider_Rank 0," are also members of the current set of indicator-degree entries in CURRENT.IND.DEG.PARRAY 330. If so, then the host computer will retrieve a text item from TEXT.ITEM.BUFFER associated with the linkset. If not, no text item is selected. The host computer 102 determines whether "Fundamental_Rank. -2" and "Insider_Rank 0" are in CURRENT.IND.DEG.PARRAY 330 by examining the node in IND.DEG.INDEX.TREE pointed to by the node pointer addresses in linksets 1 and 2. Linkset 1, for example, has a pointer address to node 2 because "Fundamental_Rank -2" is associated with node 2. The host computer 102 then retrieves the node 2 indicator-degree string ("Fundamental_Rank -2") and searches CURRENT.IND.DEG.PARRAY 330 for a matching entry. In this case, "Fundamental_Rank -2" is a member of CURRENT.IND.DEG.PARRAY 330 and thus, the host computer 102 then proceeds to retrieve a text item from TEXT.ITEM.BUFFER associated with linkset 1 as described below. This process is repeated until all of the entries in CURRENT.IND.DEG.PARRAY 330 have been analyzed.

To speed up the interpretive text generation process, interpretive text logic 104 preferably minimizes or avoids redundant searching and text item selection. That is, once the interpretive text logic 104 starts with "Analyst_Rank +3" in CURRENT.IND.DEG.PARRAY 330 and then determines that "Analyst_Rank +3 AND Fundamental_Rank -2" is true for the specified security, the interpretive text logic 104 preferably does not select a redundant text item using "Fundamental_Rank -2," the next entry in CURRENT.IND.DEG.PARRAY 330.

To avoid such unnecessary searching and text item selecting, once the interpretive text logic 104 determines that "Analyst_Rank +3 AND Fundamental_Rank -2" is true the first time and selects the associated text item, the interpretive text logic 104 in step 448 (FIG. 19) sets a flag in LINKSET.USED.FLAG.PARRAY 332 associated with linkset 1. Then, when the interpretive text logic 104 reads "Fundamental_Rank -2" from CURRENT.IND.DEG.PARRAY 330 for processing, it will determine whether that flag is already set as true in step 444 and, if so, will not proceed with searching for and selecting an associated text item, which has already been selected anyway.

In this manner, the host computer identifies all linksets that are true for the current indicator-degree values for the selected security. The linkset of addresses of some or all text items from TEXT.ITEM.BUFFER associated with these linksets are written to OUTPUT.LINKSET.PARRAY 334 in step 448. Thus, OUTPUT.LINKSET.PARRAY 334 preferably includes a list of addresses of the text items to be combined together as the interpretive text. At this point, the text items written to OUTPUT.LINKSET.PARRAY 334 must be winnowed and sorted as noted above with regard to step 414 of FIG. 18.

Figure 21:
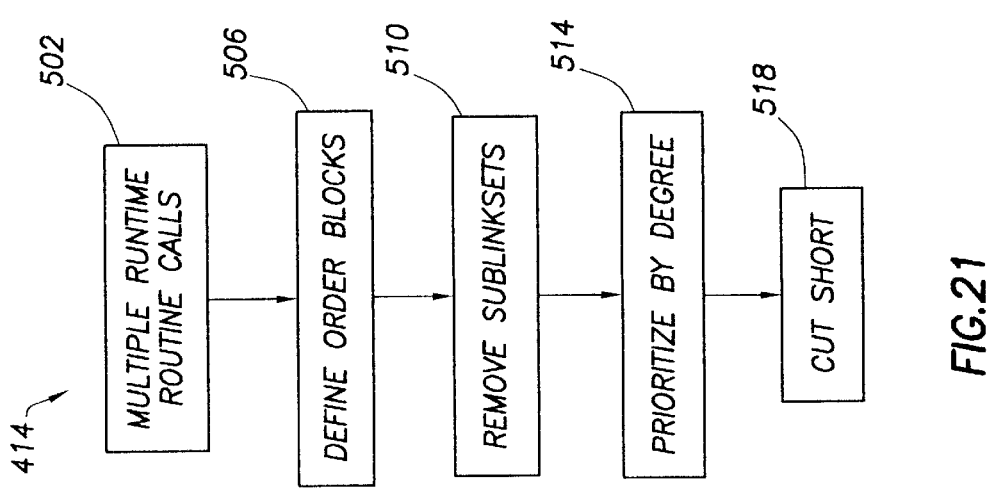
FIG. 21 shows a preferred method for winnowing and sorting the selected text items to generate the interpretive text.

Referring now to FIG. 21, a preferred winnowing and sorting method 414 is shown comprising steps 502, 506, 510, 514, and 518, although other methods for winnowing and/or sorting are also possible. Further, the order of the steps can be varied from that shown.

It may desired to begin each interpretive text passage with an introductory sentence or paragraph. One way to force a predetermined text item to always be first is execute or call the runtime routine 400 (FIG. 18) multiple times as indicated by step 502. The first time the runtime routine is called, the only indicators written into CURRENT.IND.DEG.PARRAY 330 preferably relate to the desired introductory sentence or paragraph, or other desired text item. The second time the runtime routine is called, all of the relevant indicators for generating the interpretive text are written into CURRENT.IND.DEG.PARRAY 330.

Figure 22:
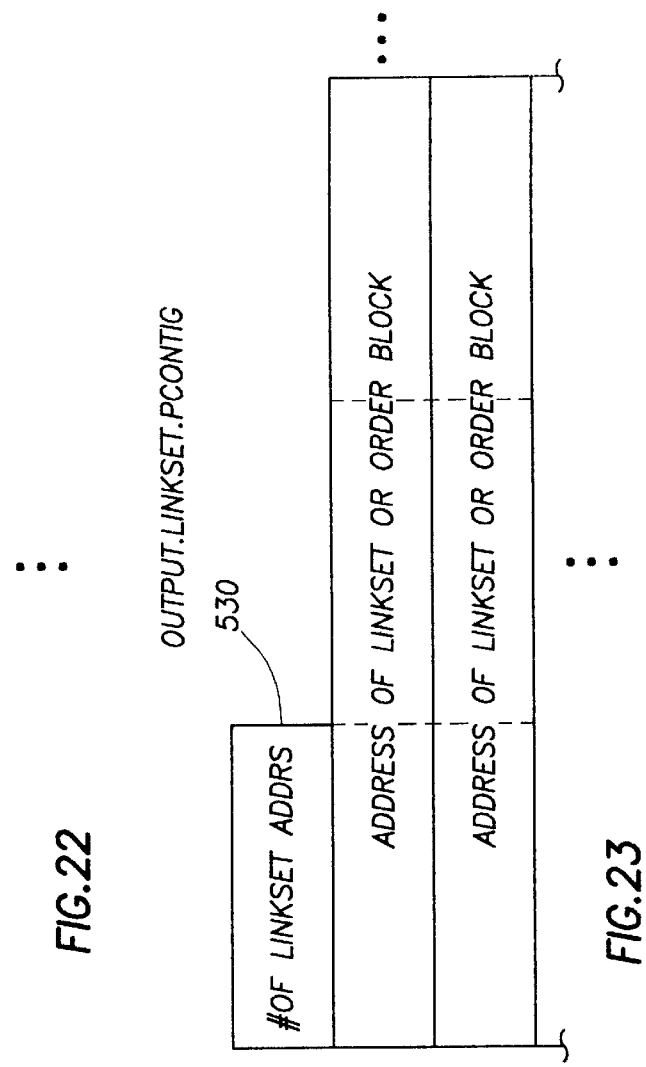
FIGS. 22–24 show various output buffers used to order the output text items in a desired order.

In step 506, various "order blocks" are defined to reorder the linkset addresses in OUTPUT.LINKSET.PARRAY. Step 506 is performed by the interpretive text logic 104 preferably using the Node Set Order Contig (NODESET.ORDER.CONTIG), the Output Linkset Port Contig (OUTPUT.LINKSET.PCONTIG), and Output Order Block Port Contig (OUTPUT.ORDER.BLOCK.PCONTIG) data structures shown in FIGS. 22–24, respectively. Referring to FIG. 22, NODESET.ORDER.CONTIG is a contig containing a block of information of varying length for each entry in the Order input file (FIG. 6). Each block in NODESET.ORDER.CONTIG specifies the order in which certain linkset and their corresponding text items preferably occur in the interpretive text output. Four bytes preferably are used to store the number of order blocks in this contig. Each order block includes the information shown in FIG. 22. Specifically, each order block includes the number of nodesets in the order block followed by the nodeset data. Each nodeset data includes one byte (not specifically shown) containing the number of node addresses in the order block followed by four bytes for each nodeset address.

Figure 23:
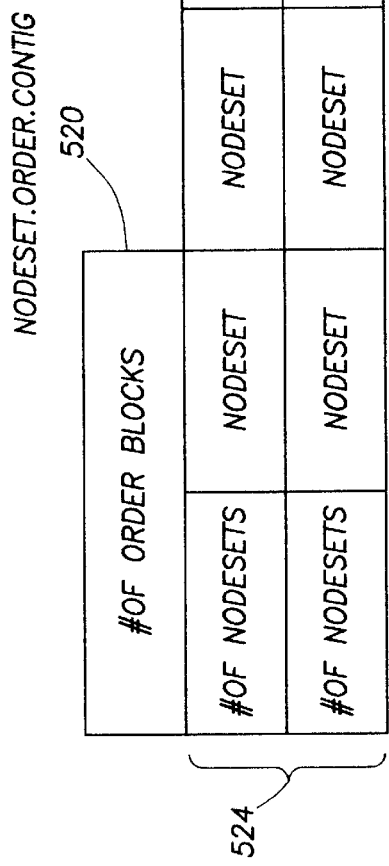

Referring to FIG. 23, the OUTPUT.LINKSET.PCONTIG data structure is a port contig that stores the addresses of the linksets from LINKSET.CONTIG that have been flagged in LINKSET.USED.FLAG.PARRAY 332 (FIG. 15) as relevant to the current interpretive text output. An initial byte includes the number of linkset addresses in this port contig. Additionally or alternatively, OUTPUT.LINKSET.PCONTIG may include the addresses of the order blocks in OUTPUT.ORDER.BLOCK.PCONTIG that are relevant to the current interpretive text output.

Figure 24:
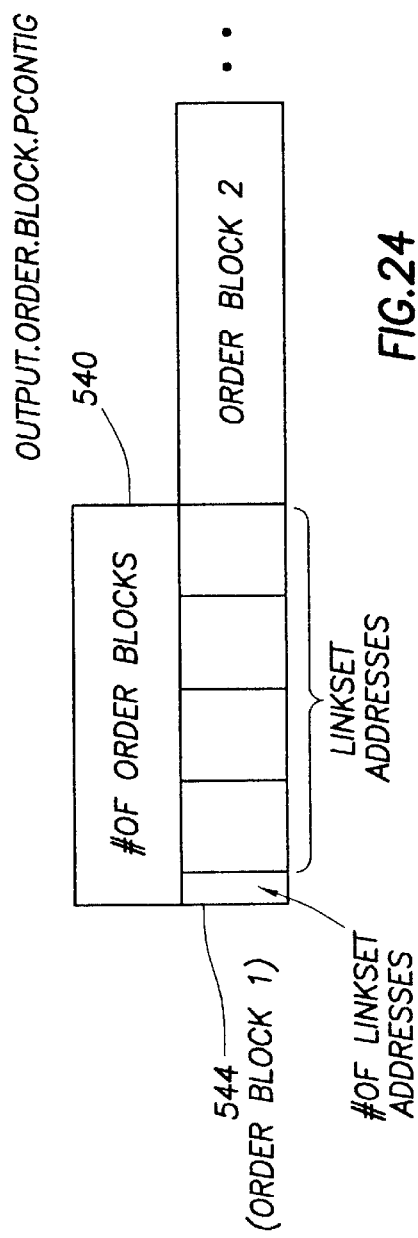

Referring to FIG. 24, OUTPUT.ORDER.BLOCK.PCONTIG is a contig that holds blocks 544 of linkset addresses that are relevant to the current output and should be output in a certain order. Value 540 specifies the number of order blocks 544 that follow. The address information in the order blocks 544 is derived from the NODESET.ORDER.CONTIG which is programmed using the indicator order information from the Order input file.

Referring again to FIG. 21, once the order blocks have been placed in the correct order in step 506, sublinksets are removed in step 510. As noted previously, sublinksets identified in SUBLINKSET.INFO.BUFFER (FIG. 25) are linksets that are members of other linksets, and as such, can be eliminated as redundant. Accordingly, the host computer 102 searches the SUBLINKSET.INFO.BUFFER to identify applicable sublinksets and then eliminates those sublinksets from OUTPUT.LINKSET.PARRAY.

Referring still to FIG. 21, the sorting and winnowing method 414 referably also prioritizes the output order by degree as indicated by step 514. In some situations, the more interesting text items may relate to indicator-degree combinations that have an indicator at or near the extremes (i.e., +3, +2, −2, −3). Thus, the text items associated with such extreme indicator degrees may be included in the interpretive text output ahead of other text items. Finally, in step 518 interpretive text logic 104 can cut short the number of text items included in the interpretive text output at a predetermined number of text items.

Referring again to FIG. 18, in step 416 the host computer preferably inserts replacement strings in accordance with the replacement tokens. This step may be carried out by searching through the selected text items for replacement tokens which preferably are identified by the symbol "&&." The host computer 102 then searches for a node identified. by the replacement token string in REPLACEMENT.TEXT.TREE (FIG. 14). If the corresponding node in REPLACEMENT.TEXT.TREE has a replacement character string 324, the replacement token is replaced with the replacement character string 324. If there is no replacement string or if the replacement token is not in REPLACEMENT.TEXT.TREE, then the replacement token is left in the interpretive text.

Figure 26:
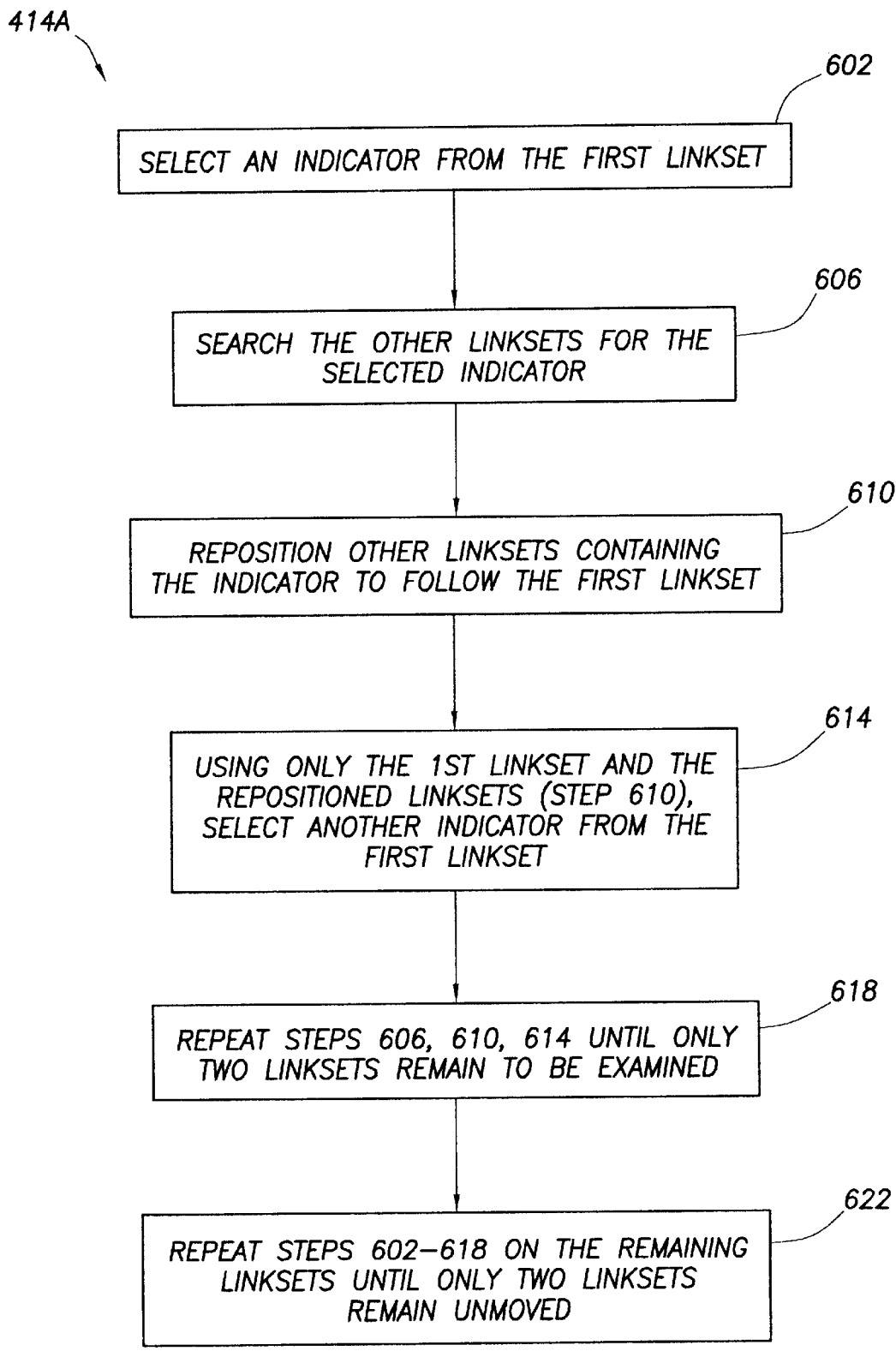
FIG. 26 shows an alternative sorting method to that shown in FIG. 21.

In addition to the winnowing and sorting method described above, there are many other winnowing and/or sorting techniques that could be used as well. Referring to FIG. 26, for example, an alternative sorting method 414A is shown comprising steps 602–622. In step 602, an indicator is selected from the first linkset in the output set of linksets. Using that indicator, all other linksets are searched for the indicator in step 606. In step 610, all other linksets containing the indicator are repositioned to follow the first linkset. Using the first linkset and the newly repositioned linksets from step 610, another indicator is chosen from the first linkset (step 614) and steps 606, 610, and 614 are repeated until only two linksets remain to be examined (step 618). Finally, steps 602–618 are repeated (step 622) on the remaining linksets not yet examined until only two linksets remain unmoved. This sorting process 414A generally places the selected text items in an order according to context. That is, text items related to the same indicator generally are grouped together in the interpretive text output.

The present invention has been described in relation to particular embodiments which are intended in all respects to be illustrative rather than restrictive. Alternative embodiments will become apparent to those skilled in the art to which the present invention pertains without departing from its spirit and scope.

What is claimed is:

1. A host computer, comprising:

a processor;

memory coupled to said processor in which data is stored;

a fixed disk drive coupled to said processor in which application programs are stored; and interpretive text logic that generates interpretive text based on one or more variables that include financial variables regarding a security;

wherein said interpretive text includes a textual explanation of the one or more variables associated with the security; and wherein said textual explanation is included in a text item file stored on the fixed disk drive, said text item file comprising a plurality of character strings that are selected by the processor and combined together to create the interpretive text.

2. A host computer, comprising:

a processor;

memory coupled to said processor in which data is stored;

a fixed disk drive coupled to said processor in which application programs are stored;

interpretive text logic which includes software execute by said processor and that generates interpretive text based on one or more variables;

wherein said fixed disk drive includes a first file containing a plurality of text items used by the interpretive text logic software to generate the interpretive text; and wherein said fixed disk drive also includes a third file containing one or more variables used by the interpretive text logic software to generate the interpretive text.

3. The host computer of claim 2 wherein the variables are financial variables and the interpretive text generated by the interpretive text logic software includes a textual explanation related to the financial variables.

4. An information system, comprising:

a processor that receives a plurality of numerical data values;

a storage device accessible by said processor in which a plurality of text strings are stored;

said processor generates interpretive text associated with said numerical data by selecting one or more of the text strings from said storage device based on at least two of said numerical data values;

wherein said numerical data values are categorized into a plurality of ranges and said processor further selects the text strings based on the particular ranges for which the numerical data values are categorized.

5. An information system, comprising:

a processor that receives a plurality of numerical data values that are categorized into a plurality of ranges;

a storage device accessible by said processor in which a plurality of text strings are stored;

said processor generates interpretive text associated with said numerical data by selecting one or more of the text strings from said storage device based on the range in which a numerical data value is categorized;

wherein said processor selects the text strings based on the range in which at least two numerical data values are categorized.

6. An information system, comprising:

a processor that receives a plurality of numerical data values;

a storage device accessible by said processor in which a plurality of text strings are stored; said processor generates interpretive text associated with said numerical data by selecting between at least two text strings from said plurality of text strings based on a numerical data value;

said numerical data values are categorized into a plurality of ranges and said processor further selects the text strings based on the particular ranges for which the numerical data values are categorized.

* * * * *